US012587822B2

(12) United States Patent
Dutta et al.

(10) Patent No.: US 12,587,822 B2
(45) Date of Patent: Mar. 24, 2026

(54) DISCOVERY OF SIDELINK DEVICES USING A DISCOVERY SEQUENCE AND A DISCOVERY REPLY SEQUENCE

(71) Applicant: QUALCOMM INCORPORATED, San Diego, CA (US)

(72) Inventors: Sourjya Dutta, San Diego, CA (US); Navid Abedini, Basking Ridge, NJ (US); Kapil Gulati, Belle Mead, NJ (US); Naeem Akl, Bridgewater, NJ (US)

( * ) Notice: Subject to any disclaimer, the term of this patent is extended or adjusted under 35 U.S.C. 154(b) by 415 days.

(21) Appl. No.: 17/879,696

(22) Filed: Aug. 2, 2022

(65) Prior Publication Data

US 2024/0048954 A1      Feb. 8, 2024

(51) Int. Cl.
| | |
|---|---|
| *H04W 16/28* | (2009.01) |
| *H04W 8/00* | (2009.01) |
| *H04W 24/08* | (2009.01) |
| *H04W 92/18* | (2009.01) |

(52) U.S. Cl.
CPC .......... *H04W 8/005* (2013.01); *H04W 16/28* (2013.01); *H04W 24/08* (2013.01); *H04W 92/18* (2013.01)

(58) Field of Classification Search
CPC .... H04W 8/005; H04W 48/10; H04B 7/0617; H04B 7/06954
See application file for complete search history.

(56) References Cited

U.S. PATENT DOCUMENTS

| | | | | |
|---|---|---|---|---|
| 2016/0338095 A1* | 11/2016 | Faurie | ............... | H04W 72/20 |
| 2017/0317740 A1* | 11/2017 | Basu Mallick | ....... | H04W 88/04 |
| 2018/0054804 A1* | 2/2018 | Luo | ........... | H04W 72/02 |
| 2018/0084480 A1* | 3/2018 | Yasukawa | ............ | H04W 88/04 |
| 2018/0092017 A1* | 3/2018 | Freda | ................... | H04B 7/155 |
| 2018/0242228 A1* | 8/2018 | Jung | ...................... | H04W 76/14 |
| 2019/0082495 A1* | 3/2019 | Kim | ..................... | H04W 76/38 |
| 2021/0127253 A1* | 4/2021 | Fakoorian | ......... | H04W 72/1263 |
| 2021/0168574 A1* | 6/2021 | Zhang | ..................... | H04W 4/40 |
| 2022/0109970 A1* | 4/2022 | Jeong | ................... | H04W 72/02 |
| 2022/0159553 A1* | 5/2022 | Ly | ........................ | H04L 5/0007 |
| 2022/0264280 A1* | 8/2022 | Chang | .................. | H04W 48/14 |
| 2023/0156751 A1* | 5/2023 | Wang | ................... | H04W 16/28 |
| | | | | 370/329 |
| 2023/0171826 A1* | 6/2023 | Selvanesan | ........... | H04W 76/14 |
| | | | | 370/310 |
| 2023/0199681 A1* | 6/2023 | Hwang | ................. | H04W 48/10 |
| 2024/0097834 A1* | 3/2024 | Van Phan | ............. | H04L 1/1864 |

* cited by examiner

*Primary Examiner* — Yee F Lam

(57) ABSTRACT

Aspects of the present disclosure provide apparatus, methods, processing systems, and computer readable mediums for a simplified technique for a first sidelink device to discover another sidelink device. In some aspects, initial beam conformance between the first and second sidelink devices is established by the discovery. In some aspects, the first and second sidelink devices may be sidelink-capable UEs.

30 Claims, 14 Drawing Sheets

700

702
TRANSMIT A DISCOVERY SEQUENCE DURING A FIRST SLOT OF ONE OR MORE FIRST SLOTS

704
MONITOR FOR A DISCOVERY REPLY SEQUENCE FROM A SECOND SIDELINK DEVICE DURING AN ASSOCIATED SECOND SLOT, WHEREIN THE ASSOCIATED SECOND SLOT IS A FIRST NUMBER OF SLOTS LATER THAN THE FIRST SLOT

706
IN RESPONSE TO DETECTING A DISCOVERY REPLY SEQUENCE DURING THE ASSOCIATED SECOND SLOT, DETERMINE AN INDICATION OF ACCEPTANCE OR AN INDICATION OF REJECTION OF SERVICE WITH THE SECOND SIDELINK DEVICE BASED ON THE DETECTED DISCOVERY REPLY SEQUENCE

Sidelink Data 206

Sidelink Control 208

212

214

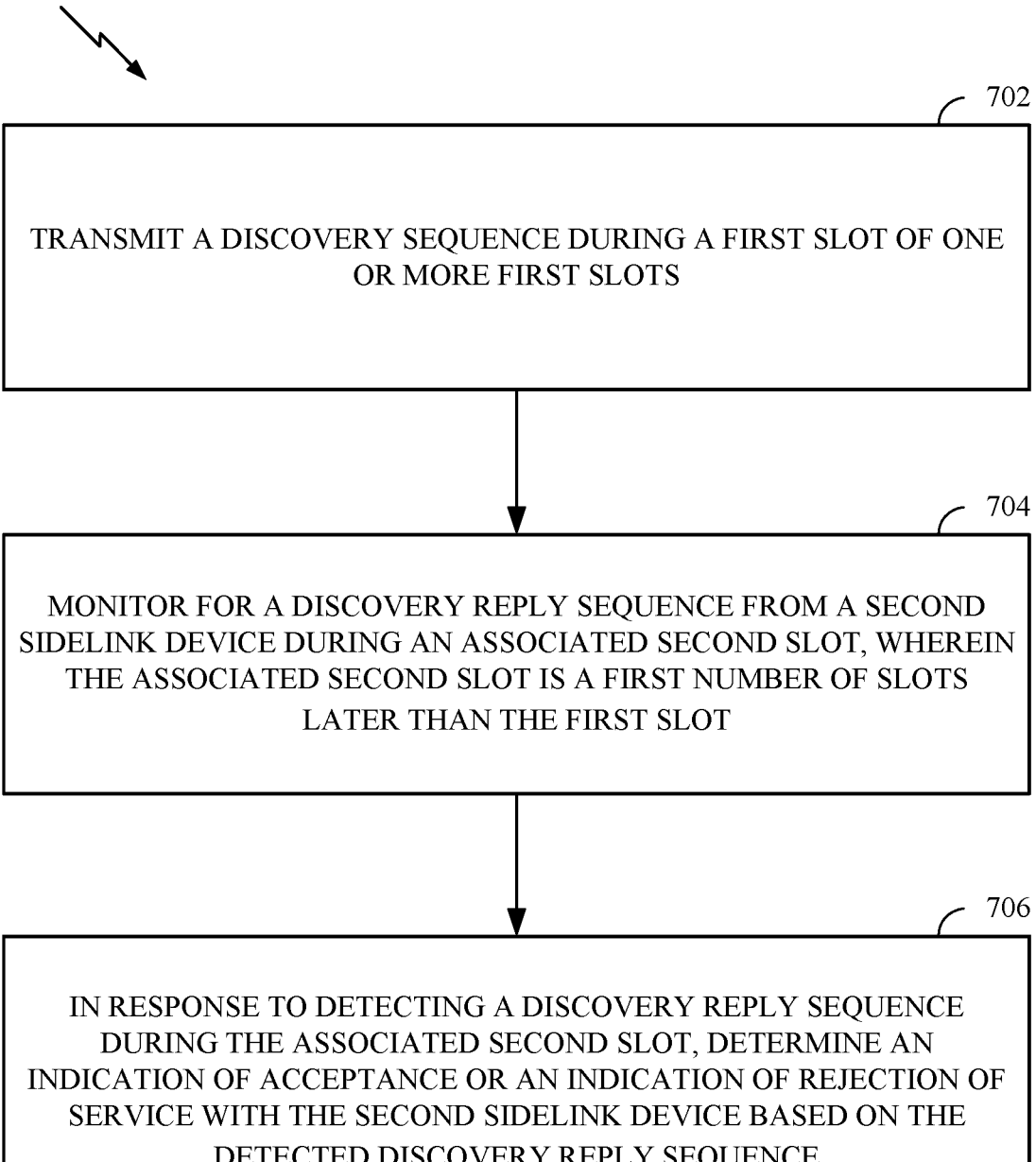

700

702

TRANSMIT A DISCOVERY SEQUENCE DURING A FIRST SLOT OF ONE
OR MORE FIRST SLOTS

704

MONITOR FOR A DISCOVERY REPLY SEQUENCE FROM A SECOND
SIDELINK DEVICE DURING AN ASSOCIATED SECOND SLOT, WHEREIN
THE ASSOCIATED SECOND SLOT IS A FIRST NUMBER OF SLOTS
LATER THAN THE FIRST SLOT

706

IN RESPONSE TO DETECTING A DISCOVERY REPLY SEQUENCE
DURING THE ASSOCIATED SECOND SLOT, DETERMINE AN
INDICATION OF ACCEPTANCE OR AN INDICATION OF REJECTION OF
SERVICE WITH THE SECOND SIDELINK DEVICE BASED ON THE
DETECTED DISCOVERY REPLY SEQUENCE

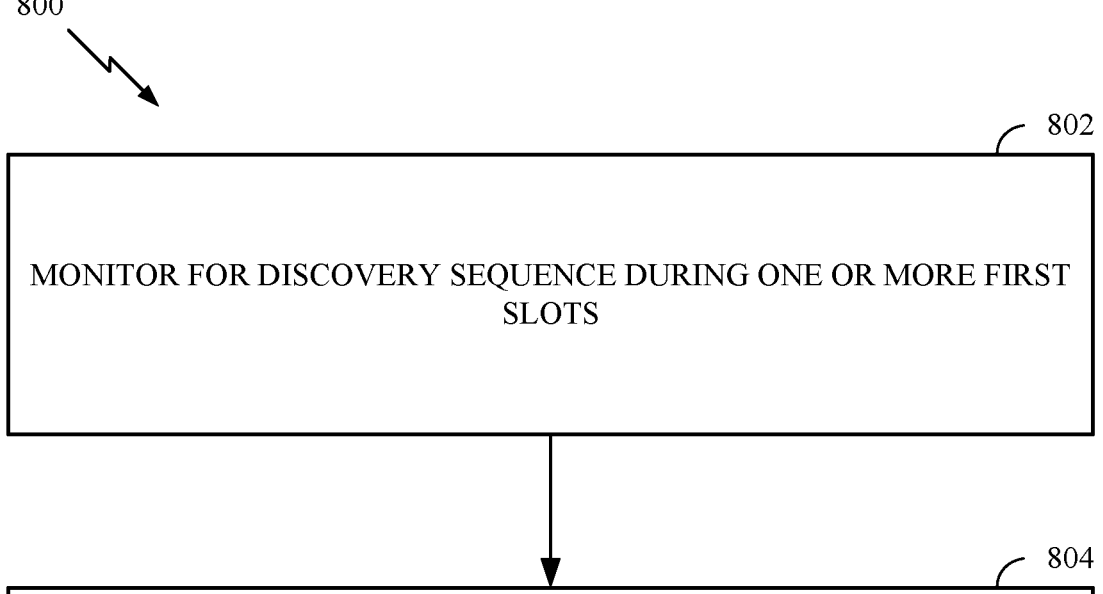

802

MONITOR FOR DISCOVERY SEQUENCE DURING ONE OR MORE FIRST SLOTS

804

IN RESPONSE TO DETECTING A DISCOVERY SEQUENCE FROM A FIRST SIDELINK DEVICE DURING A FIRST SLOT OF THE ONE OR MORE FIRST SLOTS, TRANSMIT A DISCOVERY REPLY SEQUENCE DURING AN ASSOCIATED SECOND SLOT, WHEREIN THE ASSOCIATED SECOND SLOT IS A FIRST NUMBER OF SLOTS LATER THAN THE FIRST SLOT, WHEREIN THE DISCOVERY SEQUENCE INCLUDES AN INDICATION OF ACCEPTANCE OR AN INDICATION OF REJECTION OF SERVICE WITH THE SECOND SIDELINK DEVICE.

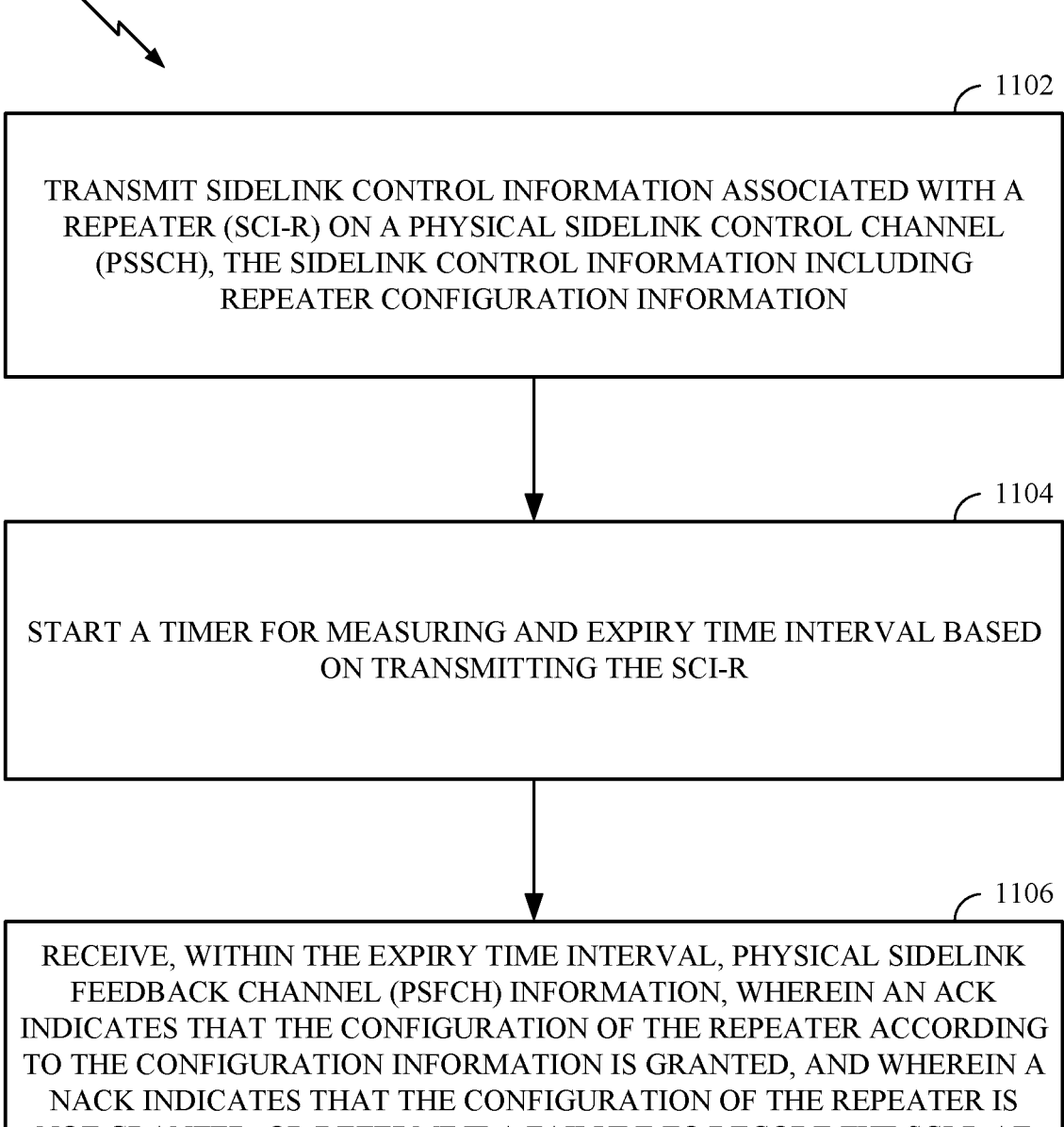

1102

TRANSMIT SIDELINK CONTROL INFORMATION ASSOCIATED WITH A
REPEATER (SCI-R) ON A PHYSICAL SIDELINK CONTROL CHANNEL
(PSSCH), THE SIDELINK CONTROL INFORMATION INCLUDING
REPEATER CONFIGURATION INFORMATION

1104

START A TIMER FOR MEASURING AND EXPIRY TIME INTERVAL BASED
ON TRANSMITTING THE SCI-R

1106

RECEIVE, WITHIN THE EXPIRY TIME INTERVAL, PHYSICAL SIDELINK
FEEDBACK CHANNEL (PSFCH) INFORMATION, WHEREIN AN ACK
INDICATES THAT THE CONFIGURATION OF THE REPEATER ACCORDING
TO THE CONFIGURATION INFORMATION IS GRANTED, AND WHEREIN A
NACK INDICATES THAT THE CONFIGURATION OF THE REPEATER IS
NOT GRANTED, OR DETERMINE A FAILURE TO DECODE THE SCI-R AT
THE REPEATER BASED ON EXPIRY OF THE TIMER

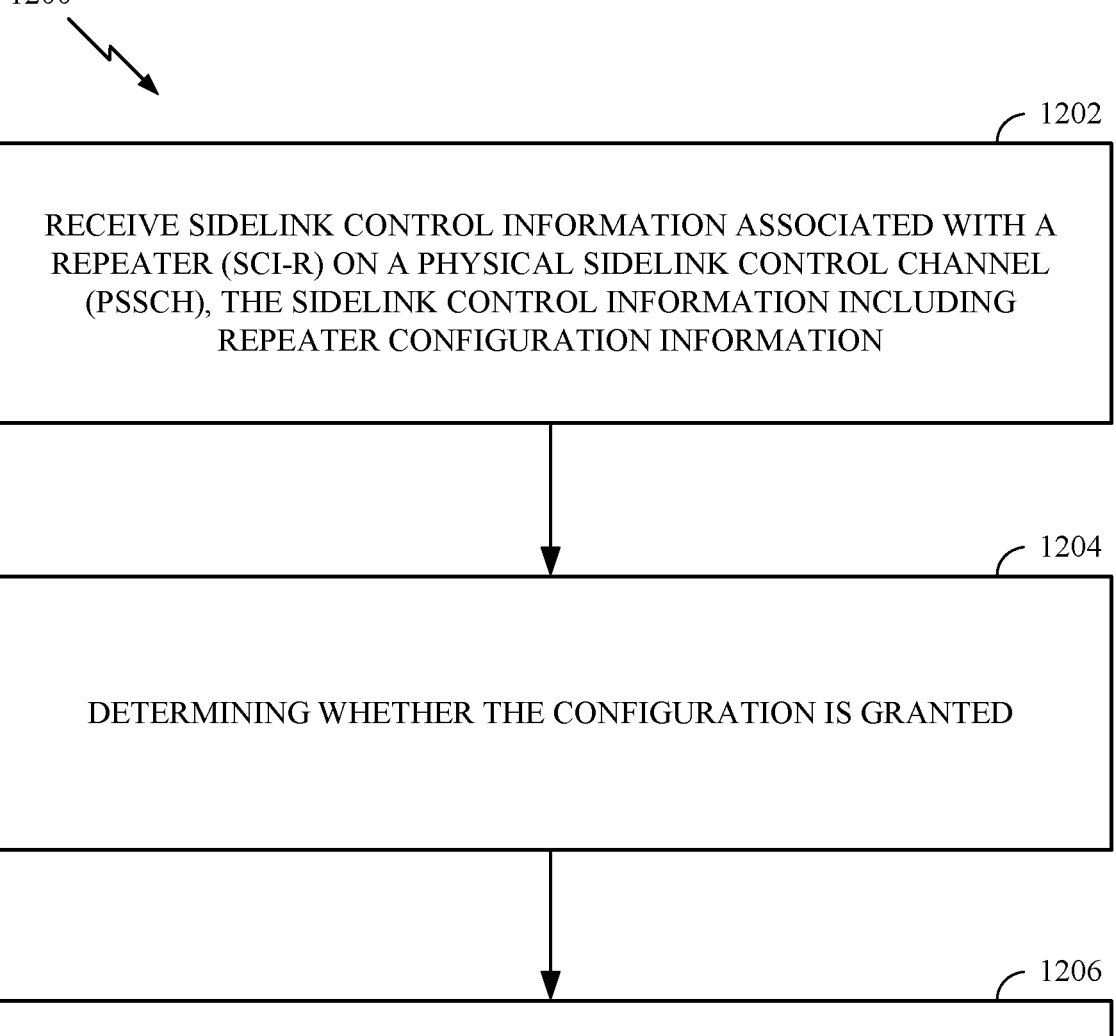

1202

RECEIVE SIDELINK CONTROL INFORMATION ASSOCIATED WITH A REPEATER (SCI-R) ON A PHYSICAL SIDELINK CONTROL CHANNEL (PSSCH), THE SIDELINK CONTROL INFORMATION INCLUDING REPEATER CONFIGURATION INFORMATION

1204

DETERMINING WHETHER THE CONFIGURATION IS GRANTED

1206

TRANSMIT PHYSICAL SIDELINK FEEDBACK CHANNEL (PSFCH) INFORMATION, WHEREIN AN ACK INDICATES THAT THE CONFIGURATION OF THE REPEATER ACCORDING TO THE CONFIGURATION INFORMATIONIS GRANTED, AND WHEREIN A NACK INDICATES THAT THE CONFIGURATION OF THE REPEATER IS NOT GRANTED

FIG. 12

DISCOVERY OF SIDELINK DEVICES USING A DISCOVERY SEQUENCE AND A DISCOVERY REPLY SEQUENCE

FIELD OF THE DISCLOSURE

Some aspects of the present disclosure generally relate to wireless communications, and more particularly, to techniques for discovery of sidelink devices. In some more specific aspects, some of the techniques described herein relate to techniques to discover sidelink devices using a discovery sequence and a discovery reply sequence. Some further aspects of the present disclosure generally relate to wireless communications, and more particularly, to techniques for control of smart repeaters via sidelink communication. In some more specific aspects, some of the techniques described herein relate to control of smart repeaters by communicating repeater configuration information via sidelink control information on a physical sidelink control channel (PSCCH).

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, which may be known as user equipments (UEs). In an LTE or LTE-A network, a set of one or more BSs may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or a DU may communicate with a set of UEs on downlink channels (e.g., for transmissions from the BS or the DU to the UE) and uplink channels (e.g., for transmissions from the UE to the BS or the DU).

These multiple access technologies have been adopted in various telecommunication standards to provide a common protocol that enables different wireless devices to communicate on a municipal, national, regional, and even global level. The NR (e.g., new radio or 5G) is an example of an emerging telecommunication standard. The NR is a set of enhancements to the LTE mobile standard promulgated by 3GPP. The NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, the NR supports beamforming, multiple-input multiple-output (MIMO) antenna technology, and carrier aggregation.

However, as the demand for mobile broadband access continues to increase, there exists a need for further improvements in the NR and the LTE technology. Preferably, these improvements should be applicable to other multi-access technologies and the telecommunication standards that employ these technologies.

SUMMARY

Aspects of the present disclosure provide for simplified technique for a first sidelink device (e.g., a sidelink-capable UE) to discover another sidelink device (e.g., a second sidelink device, such as a second sidelink-capable UE, or a repeater). In some aspects, initial beam conformance between the first and second sidelink devices is established by the discovery. In some aspects, the first and second sidelink devices may be sidelink-capable UEs. In some aspects, the first sidelink device may be a sidelink-capable UE, while the second sidelink device may be a repeater that is, e.g., configurable to forward signals associated with a link between the sidelink-capable UE and a base station, and is controllable by the first sidelink device via sidelink. Additional or alternative aspects of the present disclosure provide for techniques to configure a repeater, such as smart repeater, by using sidelink communications. The repeater may be configured to amplify and forward air interface (e.g., Uu interface) signals between one or more UEs and a base station (e.g., a gNB). The repeater configuration may be controlled by the one or more UEs via sidelink signals to decouple the repeater from network planning.

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that may include desirable communication using sidelink communications with other sidelink-capable devices and/or repeaters, such as smart repeaters.

Certain aspects provide a method of wireless communications by a first sidelink device. The method generally includes transmitting a discovery sequence during a first slot of one or more first slots, monitoring for a discovery reply sequence from a second sidelink device during an associated second slot, wherein the associated second slot is a first number of slots later than the first slot, and in response to detecting a discovery reply sequence during the associated second slot, determining an indication of acceptance or an indication of rejection of service with the second sidelink device based on the detected discovery reply sequence.

Certain aspects provide a method of wireless communications by a second sidelink device. The method generally includes monitoring for a discovery sequence during one or more first slots, in response to detecting a discovery sequence from a first sidelink device during a first slot of the one or more first slots, transmitting a discovery reply sequence during an associated second slot, wherein the associated second slot is a first number of slots later than the first slot, wherein the discovery reply sequence includes an indication of acceptance or an indication of rejection of service with the second sidelink device.

Certain aspects provide an apparatus for wireless communications by a first sidelink device. The apparatus may include at least one processor and a memory. The at least one processor and the memory may be configured to transmit a discovery sequence during a first slot of one or more first slots, monitor for a discovery reply sequence from a second sidelink device during an associated second slot, wherein the associated second slot is a first number of slots later than the first slot, and in response to detecting a discovery reply sequence during the associated second slot, determine an indication of acceptance or an indication of rejection of service with the second sidelink device based on the detected discovery reply sequence.

Certain aspects provide an apparatus for wireless communications by a second sidelink device. The apparatus may include at least one processor and a memory. The at least one processor and the memory may be configured to monitor for a discovery sequence during one or more first slots, in response to detecting a discovery sequence from a first sidelink device during a first slot of the one or more first slots, transmit a discovery reply sequence during an associated second slot, wherein the associated second slot is a first number of slots later than the first slot, wherein the discovery reply sequence includes an indication of acceptance or an indication of rejection of service with the second sidelink device.

Certain aspects provide an apparatus for wireless communications by a first sidelink device. The apparatus may comprise means for transmitting a discovery sequence during a first slot of one or more first slots, means for monitoring for a discovery reply sequence from a second sidelink device during an associated second slot, wherein the associated second slot is a first number of slots later than the first slot, and means for determining, in response to detecting a discovery reply sequence, an indication of acceptance or an indication of rejection of service with the second sidelink device based on the detected discovery reply sequence.

Certain aspects provide an apparatus for wireless communications by a first sidelink device. The apparatus may comprise means for monitoring for a discovery sequence during one or more first slots, means for transmitting, in response to detecting a discovery sequence from a first sidelink device during a first slot of the one or more first slots, a discovery reply sequence during an associated second slot, wherein the associated second slot is a first number of slots later than the first slot, wherein the discovery reply sequence includes an indication of acceptance or an indication of rejection of service with the second sidelink device.

Certain aspects provide a non-transitory computer-readable medium storing code for wireless communications. The code may comprise instructions executable by a processor to: monitor for a discovery sequence during one or more first slots, and in response to detecting a discovery sequence from a first sidelink device during a first slot of the one or more first slots, transmit a discovery reply sequence during an associated second slot, wherein the associated second slot is a first number of slots later than the first slot, wherein the discovery reply sequence includes an indication of acceptance or an indication of rejection of service with the second sidelink device.

Certain aspects provide a non-transitory computer-readable medium storing code for wireless communications. The code may comprise instructions executable by a processor to: monitor for a discovery sequence during one or more first slots, and in response to detecting a discovery sequence from a first sidelink device during a first slot of the one or more first slots, transmit a discovery reply sequence during an associated second slot, wherein the associated second slot is a first number of slots later than the first slot, wherein the discovery reply sequence includes an indication of acceptance or an indication of rejection of service with the second sidelink device.

Aspects of the present disclosure also provide various apparatus, means, and computer readable mediums for (or capable of) performing operations of the first and/or second sidelink device described above. In an aspect, an apparatus for wireless communications is provided, the apparatus comprising means configured for executing the operations of the first and/or second sidelink device, as described above. Certain aspects provide a computer program comprising program instructions which, when the program is executed by a computer, carry out the operations of the first and/or second sidelink device, as described above.

To the accomplishment of the foregoing and related ends, the one or more aspects including the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7 illustrates example operations that may be performed by a first sidelink device, to discover a second sidelink device, in accordance with certain aspects of the present disclosure.

FIG. 8 illustrates example operations that may be performed by a second sidelink device, to receive a discovery sequence from a first sidelink device, in accordance with certain aspects of the present disclosure.

FIG. 11 illustrates example operations that may be performed by a user equipment (UE), to configure a sidelink-controlled repeater, in accordance with certain aspects of the present disclosure.

FIG. 12 illustrates example operations that may be performed by a sidelink-controlled repeater, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
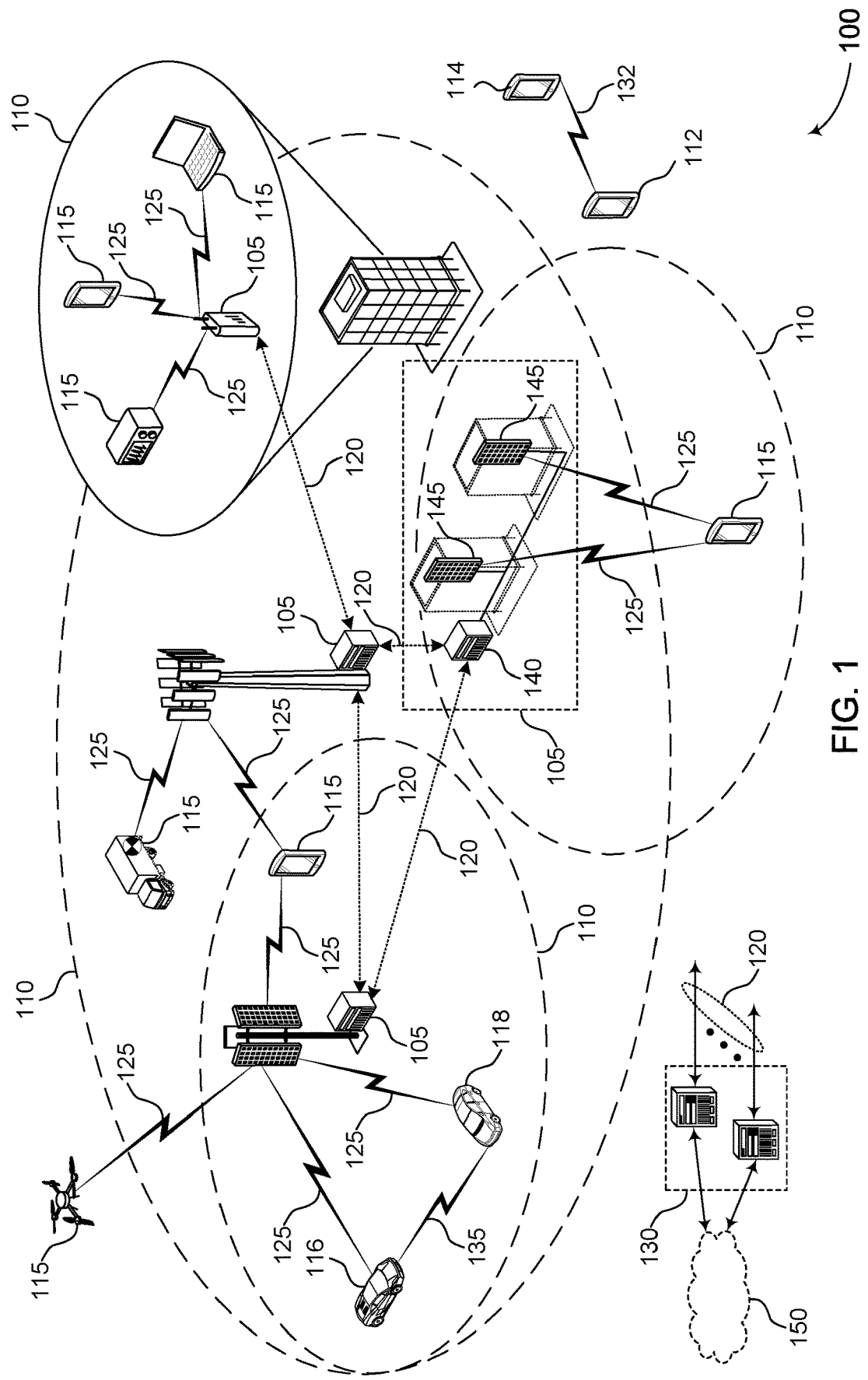
FIG. 1 is a block diagram conceptually illustrating an example wireless system, in accordance with certain aspects of the present disclosure.

FIG. 1 illustrates an example of a wireless communications system 100 that supports methods for energy savings in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

Base stations 105 may be dispersed throughout a geographic area to form the wireless communications system 100 and may be devices in different forms or having different capabilities. In some aspects, the term "base station" (e.g., the base station 105) or "network node" or "network entity" may be used interchangeably, and may refer to an aggregated base station, a disaggregated base station, an integrated access and backhaul (IAB) node, a relay node, and/or one or more components thereof. For example, in some aspects, "base station," "network node," or "network entity" may refer to a Central Unit (CU), a Distributed Unit (DU), a Radio Unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 105. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

Base stations 105 and UEs 115 may wirelessly communicate via one or more communication links 125. For an NR system, the NR-Uu interface connects a UE 115 (e.g., a 5G NR-capable UE) to a gNB over the air. In some examples, communication link 125 may thus be a Uu link, such as an NR-Uu link. For an LTE system, the LTE-Uu interface connects a UE 115 (e.g., an LTE-capable UE). In some examples, communication link 125 may thus be a Uu link, such as an LTE-Uu link. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies. In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

Each base station 105 may provide communication coverage via one or more cells, for example a macro cell, a small cell, a hot spot, or other types of cells, or various combinations thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, exterior spaces between or overlapping with geographic coverage areas 110, among other examples.

A macro cell generally covers a relatively large geographic area (for example, several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (for example, licensed, unlicensed) frequency spectrum bands as macro cells. Small cells may provide unrestricted access to UEs 115 with service subscriptions with the network provider or may provide restricted access to UEs 115 having an association with the small cell (for example, UEs 115 in a closed subscriber group (CSG), UEs 115 associated with users in a home or office, among other examples). A base station 105 may support one or multiple cells and may also support communications over the one or more cells using one or multiple component carriers.

One or more of base stations 105 may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology. A gNB may comprise a gNB Central Unit (gNB-CU) and one or more gNB Distributed Units (gNB-DUs). The gNB-CU terminates the F1 interface connected with the gNB-DU. The operation of a gNB-DU is partly controlled by gNB-CU. One gNB-DU may support one or multiple cells. One cell may be supported by one gNB-DU.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated with reference to FIG. 1. The UEs 115 may be able to communicate with various types of devices, such as other UEs 115, base stations 105, or network equipment (for example, core network nodes, relay devices, integrated access and backhaul (IAB) nodes, or other network equipment), as shown with reference to FIG. 1.

Base stations 105 may communicate with the core network 130, or with one another, or both. For example, base stations 105 may interface with the core network 130 through backhaul links 120 (for example, via an S1, N2, N3, or other interface). Base stations 105 may communicate with one another over backbone links 120 (for example, via an X2, Xn, or other interface) either directly (for example, directly between base stations 105), or indirectly (for example, via core network 130), or both. In some examples, backhaul links 120 may be or include one or more wireless links.

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, meters, among other examples.

The UEs 115 may be able to communicate with various types of devices, such as other UEs 115 that may sometimes act as relays as well as base stations 105 and network equipment including macro eNBs or gNBs, small cell eNBs or gNBs, or relay base stations, among other examples, as shown with reference to FIG. 1. UEs 115 and base stations 105 may wirelessly communicate with one another via one or more communication links 125 over one or more carriers. In some examples, a carrier may support multiple cells, and different cells may be configured according to different protocol types (for example, machine type communications (MTC), narrowband IoT (NB-IoT), enhanced mobile broadband (eMBB), or others) that may provide access for different types of devices. The term "carrier" may refer to a set of radio frequency spectrum resources having a defined physical layer structure for supporting communication links 125. For example, a carrier used for a communication link 125 may include a portion of a radio frequency spectrum band that is operated according to physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. In some examples, the receive and transmit band of a UE 115 may not need be as large as the bandwidth of the cell and may be adjusted in a process which may be referred to as bandwidth adaptation (BA), i.e., the width may be ordered to change (e.g., to shrink during period of low activity to save power), the location may move in the frequency domain (e.g., to increase scheduling flexibility), and the subcarrier spacing may be ordered to change (e.g., to allow different services). A subset of the total cell bandwidth of a cell may be referred to as bandwidth part (BWP) and BA may be achieved by configuring the UE with BWP(s) and telling the UE which of the configured BWPs is currently the active one.

The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by UEs 115. A carrier may be operated in a standalone mode in which initial acquisition and connection may be conducted by UEs 115 via the carrier, or the carrier may be operated in a non-standalone mode in which a connection is anchored using a different carrier (for example, of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, base stations 105, UEs 115, or both) may have hardware configurations that support communications over a particular carrier bandwidth or may be configurable to support communications over one of a set of carrier bandwidths. In some examples, the wireless communications system 100 may include base stations 105 and UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, in which the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, in which a numerology may include a subcarrier spacing ($\Delta f$) and a cyclic prefix. A carrier may be divided into BWPs having the same or different numerologies. In some examples, a UE 115 may be configured with multiple BWPs. In some examples, a single BWP for a carrier is active at a given time, and communications for the UE 115 may be restricted to active BWPs. Time intervals for base stations 105 or UEs 115 may be expressed in multiples of a basic time unit which may, for example, refer to a sampling period of $T_s = 1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency spectrum band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of UEs 115. For example, the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE, such as UE 112, 114, 116 and 118, may also be able to communicate directly with other UEs over a device-to-device (D2D) communication link 132, 135 (for example, using a peer-to-peer (P2P) or D2D protocol). One or more UEs, such as UEs 116 and UE 118 utilizing D2D communications may be within the geographic coverage area 110 of a base station 105 to communicate via a D2D communication link 135. Other UEs, such as UE 112 and UE 114 may be outside the geographic coverage area 110 of a base station 105 or be otherwise unable to receive transmissions from a base station 105 to communicate via D2D communication link 132. In some examples, groups of UEs 112, 114, 116, 118 communicating via D2D communications may utilize a one-to-many (1:M) system in which each UE 112, 114, 116, 118 transmits to every other UE in the group. In some examples, a base station 105 facilitates the scheduling of resources for D2D communications, such as D2D communications between UE 116 and UE 118. In other examples, D2D communications are carried out between UEs without the involvement of a base station 105, as for the D2D communications between UE 112 and UE 114.

In some aspects, the D2D communication link 135 may be an example of a sidelink communication channel. Unlike a Uu link, which is the link over the air between a UE (such as UE 115) and a base station, a sidelink is associated with the link over the air directly between UEs 115 (for example, UEs 112, 114, 116 and 118). Real-world applications of such sidelink communications may include public safety, proximity services, UE-to-network relaying, vehicle-to-vehicle (V2V) communications, vehicle to everything (V2X) communications, Internet of Everything (IoE) communications, IoT communications, mission-critical mesh, and/or various other suitable applications, such as control of a smart repeater via sidelink communications as described with some aspects of the present disclosure. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both. Generally, a sidelink may refer to signals communicated from one sidelink device (e.g., UE 112, 116) to another sidelink device (e.g., UE 114, 118) without relaying that communication through the scheduling entity (e.g., UE or base station), even though the scheduling entity may be utilized for scheduling and/or control purposes. In some examples, the sidelink signals may be communicated using a licensed spectrum (unlike wireless local area networks, which typically use an unlicensed spectrum). While some UEs may only be configured to communicate with a base station on an Uu link, there may be UEs (such as UEs 114 and 118) that are configured to communicate with a base station on an Uu link, and with other devices over a sidelink, as well (e.g., simultaneously).

In some aspects, the UEs 112, 114, 116, 118 may optionally be configured to perform beam management procedures for a sidelink. Accordingly, one or more of the UEs may function as a scheduling entity in a device-to-device (D2D), peer-to-peer (P2P), or vehicle-to-vehicle (V2V) network, and/or in a mesh network to initiate and/or schedule certain beam management procedures. In some aspects, some of the sidelink devices, such as UEs 112, 114, 116, 118 may use a discovery sequence and a discovery reply sequence to discover another sidelink device as described throughout the disclosure.

In some aspects, sidelink devices may apply techniques for control of a repeater (sometimes denoted as a smart repeater) via sidelink communications, as described throughout the disclosure. Thereby, a repeater may be configured to amplify and forward signals associated with a Uu link between a UE and a base station (e.g., a gNB), while it is configured to transmit and receive control signals on the sidelink. The control signals may be used to control the amplify and forward process performed at the repeater by a UE that terminates the Uu link.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, an Intranet, an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more radio frequency spectrum bands, typically in the range of 300 megahertz (MHz) to 300 gigahertz (GHz). Generally, the region from 300 MHz to 3 GHz is known as the ultra-high frequency (UHF) region or decimeter band, as the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using radio frequency spectrum bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (for example, LAA).

Operations in unlicensed spectrum may include downlink transmissions, uplink transmissions, P2P transmissions, or D2D transmissions, among other examples.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105 or a UE 115) to shape, direct, or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or a receiving device, such as a UE 115) a beam direction for subsequent transmission and reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some examples, transmissions by a device (for example, by a base station 105 or UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for determining a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

As part of directional communications, the one or more of the base stations 105 or the UEs 115 may support beam management for one or more downlink receive directional beams corresponding to one or more physical downlink channels or one or more uplink transmit directional beams corresponding to one or more physical uplink channels. In some examples, beam management may include performing a beam switch from one or more downlink receive directional beams to one or more alternative downlink receive directional beams, or from one or more uplink transmit directional beams to one or more alternative uplink transmit directional beams to improve communications between the one or more of the base stations 105 or the UEs 115 or between the different UEs 115. In some examples, the alternative directional beams may have one or more of a higher reference signal received power (RSRP), a smaller SNR, or a smaller signal to interference and noise ratio (SINR), as compared to existing directional beams used by one or more of the base stations 105 or the UEs 115.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which the device may provide HARQ feedback in a specific slot for data received in a previous symbol in the slot. In other examples, the device may provide HARQ feedback in a subsequent slot, or according to some other time interval.

One or more of base stations 105 or UEs 115 may support directional communications in the wireless communications system 100. Directional communications may include one or more downlink receive directional beams corresponding to one or more physical downlink channels or one or more uplink transmit directional beams corresponding to one or more physical uplink channels. The one or more physical downlink channels may include one or more of a physical downlink control channel (PDCCH), a physical downlink shared channel (PDSCH) or a synchronization signal physical broadcast channel (SS/PBCH) block, and the one or more physical uplink channels may include one or more of a physical uplink control channel (PUCCH) or a physical uplink shared channel (PUSCH). In some examples, the one or more of the base stations 105 or the UEs 115 may perform a beam sweep procedure to determine and select one or more downlink receive directional beams and one or more uplink transmit directional beams to establish a connection.

In some examples, the one or more of the base stations 105 or the UEs 115 may support directional communications in one or more radio frequency spectrum bands. In some examples, a radio frequency spectrum band may be defined by a range of radio frequencies (f) within the radio frequency spectrum band. For example, a first frequency range (FR1) may have a frequency range between 410 MHz and 7.125 GHz (410 MHz<f<7.125 GHz), a second frequency range (FR2) may have a different frequency range from FR1, for example, between 24.25 GHz and 52.6 GHz (24.25 GHz<f<52.6 GHz), while a third frequency range (FR3) may have a different frequency range from FR1 and FR2, for example, between 7.125 GHz and 24.25 GHz (7.125 GHz<f<24.25 GHz). In some examples, one or more of FR1, FR2, or FR3 may be referred to as a low radio frequency spectrum band. As such, in some examples, the one or more of the base stations 105 or the UEs 115 may support directional communications in low radio frequency spectrum bands.

Additionally, or alternatively, the one or more of the base stations 105 or the UEs 115 may support directional communications in one or more high radio frequency spectrum bands. A high radio frequency spectrum band may refer to a radio frequency spectrum band that is greater than or equal to a frequency (f) (for example, greater than 52.6 GHz). In some examples, a radio frequency spectrum band including frequencies between 52.6 GHz and 114.25 GHz (52.6 GHz<f<114.25 GHz) may be referred to as a fourth frequency range (FR4), while a radio frequency spectrum band including frequencies between 114.25 GHz and 275 GHz (114.25 GHz<f<275 GHz) may be referred to as a fifth frequency range (FR5). Therefore, FR4 and FR5 may be referred to as high radio frequency spectrum bands.

Each radio frequency spectrum band, such as FR1, FR2, FR3, FR4 and FR5 may relate to a transmission numerology. Table 1 below defines examples of different transmission numerologies. In some examples, the one or more of the base stations 105 or the UEs 115 may support one or more transmission numerologies as defined in Table 1. Each numerology in Table 1 may be labeled as a parameter $\mu$. In some examples, the numerology may be based on exponentially scalable subcarrier spacing $\Delta f = 2^\mu \times 15$ kHz with $\mu=\{0, 1, 2, 3, 4\}$. As defined in Table 1, a numerology ($\mu=0$) represents a subcarrier spacing of 15 kHz. Among other examples, as defined in Table 1, numerology ($\mu=1$) represents a subcarrier spacing of 30 kHz, numerology ($\mu=2$) represents a subcarrier spacing of 60 kHz, numerology ($\mu=3$) represents a subcarrier spacing of 120 kHz, and numerology ($\mu=4$) represents a subcarrier spacing of 240 kHz.

TABLE 1

| | Transmission Numerologies. | | | |
| --- | --- | --- | --- | --- |
| $\mu$ | $\Delta f = 2^\mu \cdot 15$ [kHz] | Cyclic Prefix | Supported for Data | Supported for Synch |
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

By way of example, radio frequency spectrum band FR1 may relate to transmission numerologies $\mu=\{0, 1, 2\}$. For example, radio frequency spectrum band FR1 may support subcarrier spacings of 15 kHz, 30 kHz, and 60 kHz, which may correspond to a symbol duration of approximately 71 microseconds ($\mu$s), 36 $\mu$s, and 18 $\mu$s, respectively. The symbol duration (for example, approximately 71 $\mu$s, 36 $\mu$s, and 18 $\mu$s) may include a duration of a cyclic prefix of the symbol. The base stations 105 or the UE 115 may prepend a cyclic prefix to each symbol to improve transmission of the symbol. A cyclic prefix may represent a guard period at a beginning of each symbol that may improve transmission reliability of the symbol by providing protection against one or more factors in the wireless communications system 100, such as multipath delay spread. Among other examples, radio frequency spectrum band FR2 may relate to transmission numerologies $\mu=\{2, 3, 4\}$. For example, radio frequency spectrum band FR2 may support subcarrier spacings of 60 kHz, 120 kHz, and 240 kHz, which may correspond to symbol durations of approximately 18 $\mu$s, 9 $\mu$s, and 4.5 $\mu$s, respectively. Similarly, the symbol duration (for example, approximately 18 $\mu$s, 9 $\mu$s, and 4.5 $\mu$s) may include a duration of a cyclic prefix for the symbol.

In some examples, as shown in Table 1, a duration of a cyclic prefix may depend on the transmission numerology. That is, a duration of a cyclic prefix may be shorter or greater in length based on the transmission numerology. For example, a cyclic prefix may have a duration of 4.7 $\mu$s for a 15 kHz subcarrier spacing (for example, numerology $\mu=0$), and 0.57 $\mu$s for a 120 kHz subcarrier spacing (for example, numerology $\mu=3$). In some examples, as defined in Table 1, a normal cyclic prefix may be supported for each subcarrier spacing (for example, for each transmission numerology), while an extended cyclic prefix may be supported exclusively for numerology $\mu=2$. A normal cyclic prefix may be shorter in length compared to an extended cyclic prefix. For example, a normal cyclic prefix may have a duration of 4.7 $\mu$s, while an extended cyclic prefix may have a duration of 16.7 $\mu$s. As demand for communication efficiency increases, the wireless communications system 100 may support larger subcarrier spacings for one or more high radio frequency spectrum bands (for example, FR4 and FR5). Some examples of the wireless communications system 100 may support one or more of subcarrier spacings of 480 kHz, 960 kHz, 1.92 MHz, or 3.84 MHz for one or more high radio frequency spectrum bands (for example, FR4 and FR5). However, the wireless communications system 100 is not limited to the above examples of subcarrier spacings (for example, 480 kHz, 960 kHz, 1.92 MHz, or 3.84 MHz), as other subcarrier spacings may be supported in the wireless communications system 100.

In some examples, for radio frequency spectrum band FR2, the base stations 105 or the UEs 115 may support a 240 kHz subcarrier spacing exclusively for synchronization signal blocks (SSBs). In general, the term "SSB" may commonly refer to a synchronization signal and PBCH block. The SSB may span across four OFDM symbols and may comprise the primary synchronization signal (PSS), the secondary synchronization signal (SSS) and the PBCH. The PSS and SSS may occupy each one OFDM symbol and 127 subcarriers, while the PBCH may span across three OFDM symbols and 240 subcarriers but leaving an unused range of 127 subcarriers in the middle for the SSS in one of the three OFDM symbols. The periodicity of the SSB may be configurable by the network and the time locations where SSB can be sent may be determined by subcarrier spacing. In some examples, within the frequency span of a carrier, multiple SSBs may be transmitted, and the physical cell identifiers (PCIs) of those SSBs do not have to be unique, i.e., different SSBs may have different PCIs. However, in some examples, when an SSB is associated with remaining minimum system information (RMSI), the SSB may correspond to an individual cell, which may have a unique NR cell global identifier (NCGI). Such an SSB may then be referred to as a cell-defining SSB (CD-SSB).

In related aspects, the term "global channel raster" may refer to a set of radio frequency (RF) reference frequencies, wherein a RF reference frequency may be used in signaling to identify the position of RF channels, SSBs, and other elements in a wireless communication system, such as NR. In particular, RF frequencies may be designated by an NR Absolute Radio Frequency Channel Number (NR-ARFCN) on the global frequency raster. In some examples, the global frequency raster may be defined for all frequencies from 0 to 100 GHz with a granularity denoted as $\Delta F_{Global}$, which may depend on a frequency range. For example, $\Delta F_{Global}$ may be equal to 5 kHz in a frequency range from 0 to 3 GHz, 15 kHz in a frequency range from 3 GHz to 24,25 GHz, and 60 kHz and in a frequency range from 24,25 GHz to 100 GHz. In other related aspects, the term "channel raster" may refer to a set of RF reference frequencies $F_{REF}$ that may be used to identify the RF channel position in the uplink and downlink. The RF reference frequency for an RF channel may map to a resource element on a carrier. For each operating band, which may be predefined, only a subset of frequencies from the global frequency raster may be applicable for that band and may form a channel raster with a granularity $\Delta F_{Raster}$, which may be equal to or larger than $\Delta F_{Global}$.

In some related aspects, the term "synchronization raster" may be used to refer to the frequency positions of the SSB, that can be used by the UE for system acquisition when explicit signaling of the SSB position is not present. A global synchronization raster may be defined for all frequencies. For example, in a wireless communication system such as NR, the frequency position of the SSB may be defined as $SS_{REF}$ with corresponding Global Synchronization Channel Number (GSCN). The synchronization raster and the subcarrier spacing of the SSB may be defined separately for each operating band, which may therefore be regarded as a plurality of different synchronization rasters. In some examples, the operating bands may correspond to those defined in Table 2 for NR FR2.

TABLE 2

| NR operating bands in FR2 | | | |
|---|---|---|---|
| | Uplink (UL) operating band BS receive UE transmit | Downlink (DL) operating band BS transmit UE receive | |
| Operating Band | $F_{UL\_low}$-$F_{UL\_high}$ | $F_{DL\_low}$-$F_{DL\_high}$ | Duplex Mode |
| n257 | 26500 MHz-29500 MHz | 26500 MHz-29500 MHz | TDD |
| n258 | 24250 MHz-27500 MHz | 24250 MHz-27500 MHz | TDD |
| n259 | 39500 MHz-43500 MHz | 39500 MHz-43500 MHz | TDD |
| n260 | 37000 MHz-40000 MHz | 37000 MHz-40000 MHz | TDD |
| n261 | 27500 MHz-28350 MHz | 27500 MHz-28350 MHz | TDD |

In some examples, the synchronization raster for each operating band shown in Table 2 may be defined as indicated in Table 3, wherein the distance between GSCN entries may be given by the <Step size>. The SSB pattern may correspond either to Case D (SCS: 120 kHz, the first symbols of the candidate SS/PBCH blocks have indexes {4, 8, 16, 20}+28·n, with n=0, 1, 2, 3, 5, 6, 7, 8, 10, 11, 12, 13, 15, 16, 17, 18 for carrier frequencies within FR2) or to Case E (SCS: 240 kHz, the first symbols of the candidate SS/PBCH blocks (SSBs) have indexes {8, 12, 16, 20, 32, 36, 40, 44}+56·n, with n=0, 1, 2, 3, 5, 6, 7, 8 for carrier frequencies within FR2).

TABLE 3

| Applicable SS raster entries per operating band. | | | |
|---|---|---|---|
| NR Operating Band | SSB SCS | SSB pattern | Range of GSCN (First-<Step size>-Last) |
| n257 | 120 kHz | Case D | 22388-<1>-22558 |
| | 240 kHz | Case E | 22390-<2>-22556 |
| n258 | 120 kHz | Case D | 22257-<1>-22443 |
| | 240 kHz | Case E | 22258-<2>-22442 |
| n259 | 120 kHz | Case D | 23140-<1>-23369 |
| | 240 kHz | Case E | 23142-<2>-23368 |
| n260 | 120 kHz | Case D | 22995-<1>-23166 |
| | 240 kHz | Case E | 22996-<2>-23164 |
| n261 | 120 kHz | Case D | 22446-<1>-22492 |
| | 240 kHz | Case E | 22446-<2>-22490 |

In further related aspects, the term "cell search" may refer to a procedure for a UE to acquire time and frequency synchronization with a cell and to detect the Cell ID of the cell. For example, NR cell search may be based on PSS, SSS and PBCH demodulation reference signal (PBCH DMRS) located on the synchronization raster. In some examples, a PCell may always be associated to a CD-SSB located on the synchronization raster.

Figure 2:
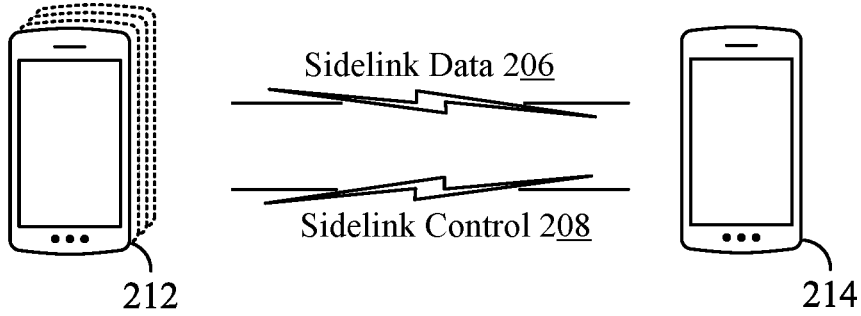
FIG. 2 is a diagram conceptually illustrating an example of a first one or more first sidelink devices communicating with a second sidelink device in a sidelink communication in accordance with certain aspects of the present disclosure.

FIG. 2 is a diagram conceptually illustrating a sidelink communication between one or more first sidelink devices 212 (collectively "first sidelink device") and a second sidelink device 214. In various examples, any one of the first sidelink device 212 and the second sidelink device may correspond to a UE 115 or other suitable node in the wireless communication network 100 of FIG. 1. For example, any one of the first sidelink device 212 and the second sidelink device 214 may correspond to one of UE 112, 114, 116, and/or 118. Sidelink communication may be used with both frequency division duplexing (FDD) and time division duplexing (TDD) sidelink carriers.

In some examples, the first sidelink device 212 and the second sidelink device 214 may utilize sidelink signals for direct D2D communication. Sidelink signals may include sidelink data 206 (i.e., sidelink traffic) and sidelink control information 208. Broadly, the first one or more sidelink devices 212 and a second sidelink device may communicate sidelink data 206 and sidelink control information 208 using one or more data channels and control channels. In some aspects, data channels may include a physical sidelink shared channel (PSSCH) and/or sidelink shared channel (SL-SCH). In some aspects, control channels may include a physical sidelink control channel (PSCCH) and/or physical sidelink feedback channel (PSFCH).

In some configurations, any one or more of the first sidelink device 212 or the second sidelink device 214 may be responsible for initiating and/or scheduling traffic in a D2D communication, including the communication of sidelink data 206 and sidelink control information 208, and maintenance of the sidelink communication channel(s). In an aspect, the first sidelink device 212 may be responsible for scheduling and/or initiating beam management procedures.

The channels or carriers illustrated in FIG. 2 are not necessarily all of the channels or carriers that may be utilized between a first sidelink device 212 and a second sidelink device 214 in a sidelink communication, and those of ordinary skill in the art will recognize that other channels or carriers may be utilized in addition to those illustrated, such as other data, control, and feedback channels.

Figure 3:
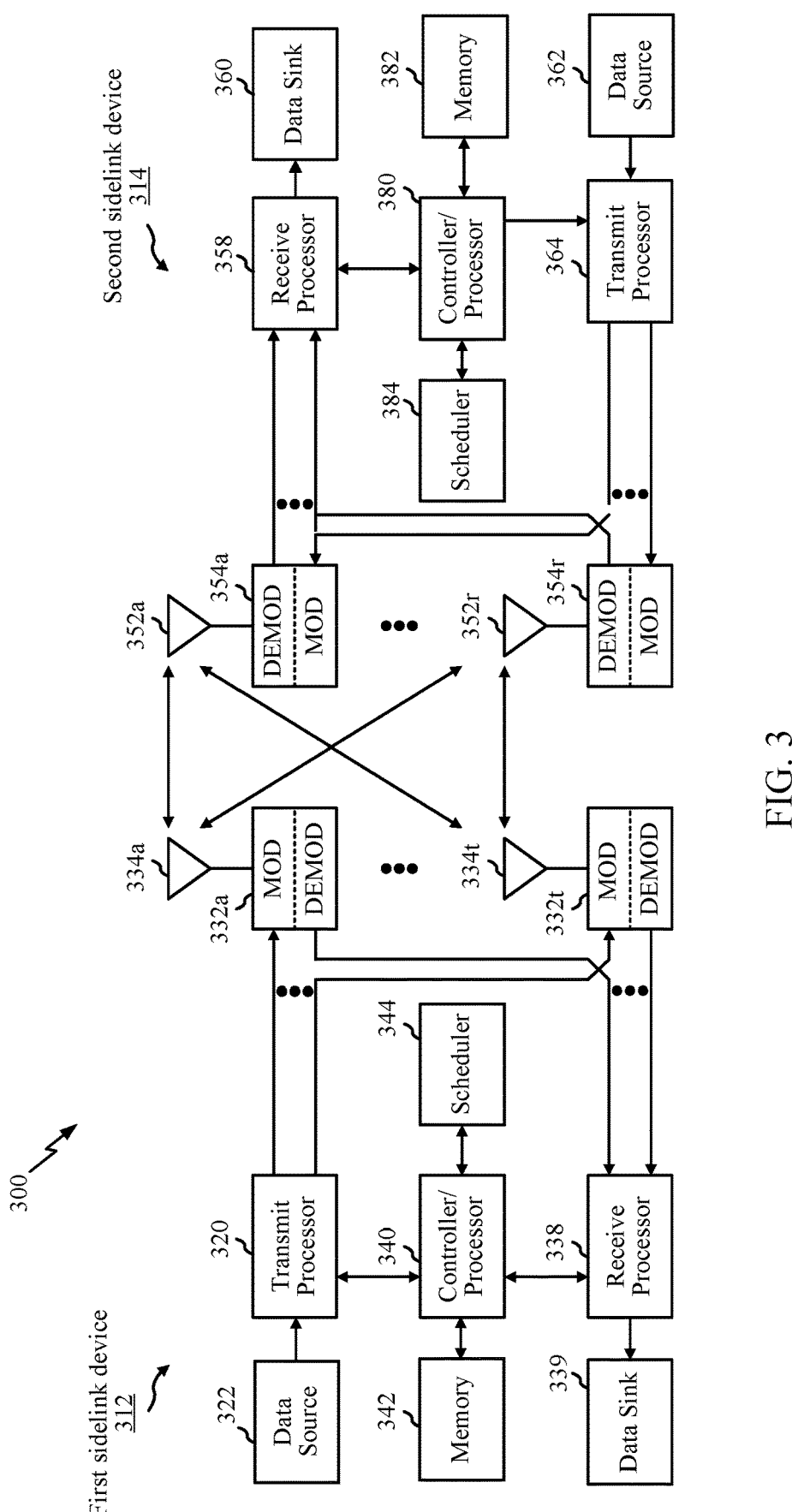
FIG. 3 is a block diagram conceptually illustrating a design of an example first sidelink device and second sidelink device, in accordance with certain aspects of the present disclosure.

FIG. 3 illustrates example components of a first sidelink device 312 and a second sidelink device 314, which may be used to implement aspects of the present disclosure. For example, antennas 352, processors 358, 364, and/or controller/processor 380 of the first sidelink device 312 and/or antennas 334, processors 320, 338, and/or controller/processor 340 of the second sidelink device 314 may be used to perform the various techniques and methods described herein. In various examples, any one of the first sidelink device 312 and the second sidelink device may correspond to a UE 115 or other suitable node in the wireless communication network 100 of FIG. 1. For example, the first sidelink device 312 and the second sidelink device 314 may correspond to one of UE 112, 114, 116, and/or 118 as illustrated in FIG. 1.

According to some aspects, a transmit processor 320 at the first sidelink device 312 may receive data from a data source 322 and control information from a controller/processor 340. The control information may be for a physical sidelink broadcast channel (PSBCH) or a physical sidelink control channel (PSCCH). The data may be for the physical sidelink shared channel (PSSCH), etc. The processor 320 may process (e.g., encode and symbol map) the data and control information to obtain data symbols and control symbols, respectively. The transmit processor 320 may also generate reference symbols, such as for the primary synchronization signal (PSS), secondary synchronization signal (SSS), and cell-specific reference signal (CRS), and may provide output symbol streams to the modulators (MODs) 332a-332t. Each modulator 332 may process a respective output symbol stream (e.g., for OFDM, etc.) to obtain an output sample stream. Each modulator may further process (e.g., convert to analog, amplify, filter, and upconvert) the output sample stream to obtain a signal. Signals from modulators 332a-332t may be transmitted via the antennas 334a-334t, respectively.

At the second sidelink device 314, the antennas 352a-352r may receive the transmitted signals from the first sidelink device 312 and may provide the received signals to the demodulators (DEMODs) in transceivers 354a-354r, respectively. Each demodulator 354 may condition (e.g., filter, amplify, downconvert, and digitize) a respective received signal to obtain input samples. Each demodulator may further process the input samples (e.g., for OFDM, etc.) to obtain received symbols. A receive processor 358 may obtain received symbols from all the demodulators 354a-354r, process (e.g., demodulate, deinterleave, and decode) the detected symbols, provide decoded data for the second sidelink device 314 to a data sink 360, and provide decoded control information to a controller/processor 380.

At the second sidelink device 314, a transmit processor 364 may receive and process data (e.g., for the PSSCH) from a data source 362 and control information (e.g., for the PSCCH) from the controller/processor 380. The transmit processor 364 may also generate reference symbols for a reference signal (e.g., for the sounding reference signal (SRS)). The symbols from the transmit processor 364 may be processed by the demodulators in transceivers 354a-354r (e.g., for SC-FDM, etc.), and transmitted to the first sidelink device 312. At the first sidelink device 312, signals from the second sidelink device 314 may be received by the antennas 334, processed by the modulators 332, and further processed by a receive processor 338 to obtain decoded data and control information sent by the second sidelink device 314. The receive processor 338 may provide the decoded data to a data sink 339 and the decoded control information to the controller/processor 340.

In some aspects, the first sidelink device 312 and the second sidelink device 314 may include multiple antennas (334a through 334t and 352a through 352r) configured for beamforming. That is the first sidelink device 312 and the second sidelink device 314 may be configured for directional signal transmission or reception. For a beamformed transmission, the amplitude and phase of each antenna in an array of antennas may be precoded, or controlled to create a desired (e.g., directional) pattern of constructive and destructive interference in the wavefront, as explained above. The use of such multiple antenna technology enables the wireless communication system to exploit the spatial domain to support spatial multiplexing and transmit diversity.

The controllers/processors 340 and 380 may direct the operation at the first sidelink device 312 and the second sidelink device 314, respectively. The controller/processor 340 and/or other processors and modules at the first sidelink device 312 may perform or direct the execution of processes for the techniques such as beam management (e.g., initial beam selection procedures, beam sweeping procedures, beam refinement procedures, etc.). The memories 342 and 382 may store data and program codes for first sidelink device 312 and the second sidelink device 314, respectively. The schedulers 344 and 384 may schedule the first sidelink device 312 and/or the second sidelink device 314 for transmitting and receiving data.

In an aspect, the first sidelink device 312 and the second sidelink device 314 may be configured for performing the techniques described herein. In an aspect, the first sidelink device 312 and the second sidelink device 314 are sidelink-capable UEs.

Certain aspects of the present disclosure relate to layer 1 (L1) relays. L1 relays may have many favorable features. For example, such L1 relays are relatively simple, low-cost, low-power, and may be wirelessly connected to a base station (such as a gNB) or another relay. An advantage of L1 relays is that they do not add latency, as they simply amplify and forward a signal. Some L1 relays may use full-duplex mode (e.g., for FDD mode), i.e., one frequency band for downlink, and another one for uplink. Some L1 relays (e.g., TDD mode) may switch between uplink and downlink. New technologies, such as 5G NR may gain considerably from L1 relay deployment, in particular when they are used in combination with mmW communication, where signal attenuation and blocking may create coverage holes.

In some cases, L1 relays are deployed as part of a network infrastructure. While it may be relatively simple to deploy L1 relays that receive a signal on one port to amplify and forward it to a second port, extending this to multi-antenna L1 relays may require enhancements to the architecture as well as additional protocol and interface design for control. There may also be an impact on network planning, as the network may need to handle different sets of beams at a gNB (e.g., a donor gNB) and at an associated L1 relay. Aspects of the present disclosure may relate to coverage enhancements using L1 relays (such as smart repeaters) for the mmW band that are independent from such network planning aspects.

Figure 4:
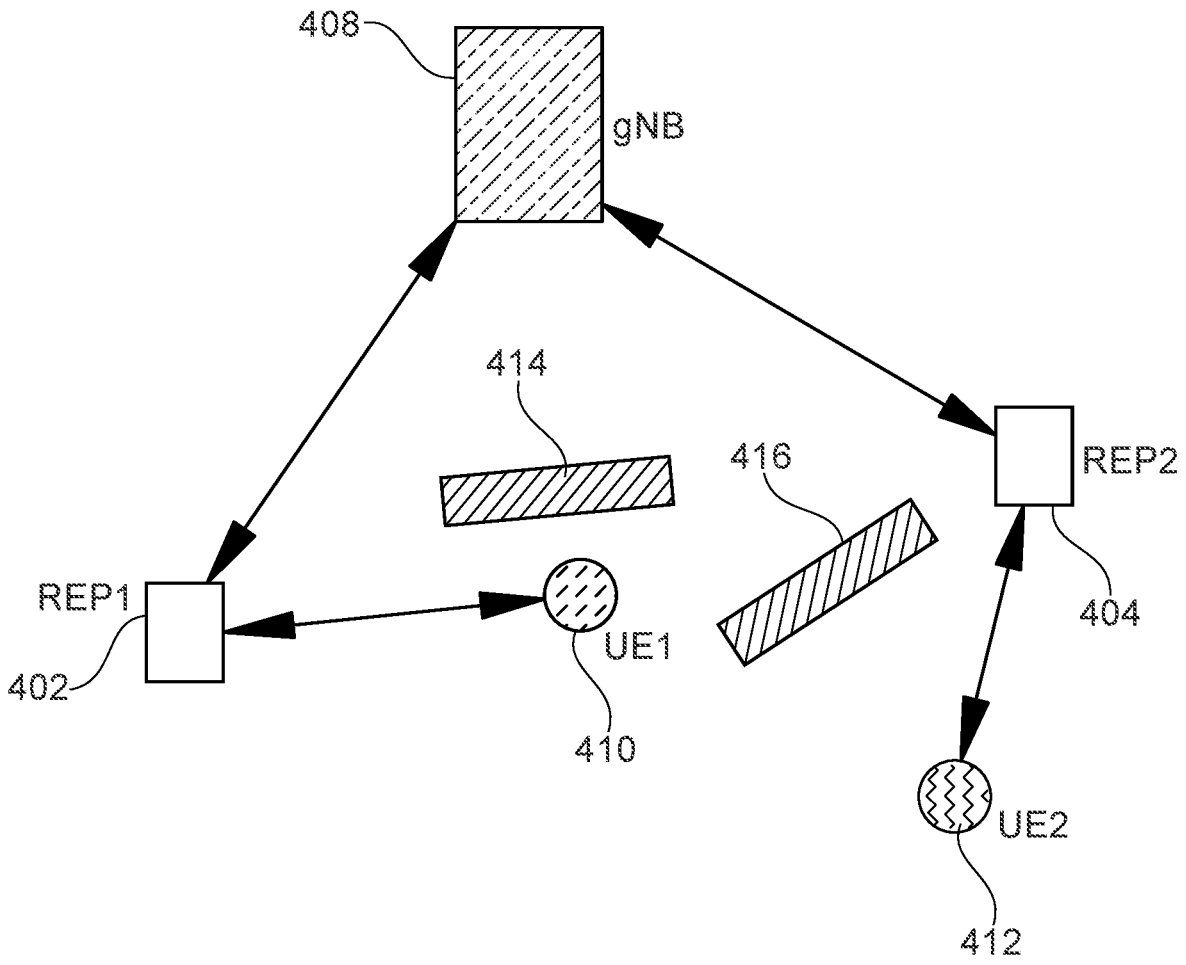
FIG. 4 is a block diagram of an example wireless system deploying repeaters, in which aspects of the present disclosure may be implemented.

FIG. 4 illustrates one example application of how L1 relays (such as smart repeaters) may be used to help improve coverage by overcoming blockage (for instance, obstruction of RF signals by an object), in accordance with aspects of the present disclosure. It is generally understood that the blockage is a major issue in millimeter wave (mmW) where beamforming is used to send directional RF signals. In the illustrated example, L1 relays (for example, REP1 402 and REP2 404) may allow a gNB 408 to serve UEs (for example, UE1 410 and UE2 412) even though objects prevent gNB directional RF signals from reaching the UEs.

As illustrated, because the REP1 402 is not blocked by the objects, the REP1 402 may receive the RF signals from the gNB 408 and relay or forward the RF signals to reach the UE1 410 (although the UE1 410 is blocked by the first object 414 from receiving the RF signals directly from the gNB 408). Similarly, because the REP2 404 is not blocked by the objects, the REP2 404 may receive the RF signals from the gNB 408 and relay the RF signals to reach the UE2 412 (although the UE2 412 is blocked by the second object 416 from receiving the RF signals directly from the gNB 408). As demonstrated by this example, L1 relays may serve as relatively simple and inexpensive solutions to provide protection against the blockage by the objects, extend the coverage of a mmW cell, and fill coverage holes.

Figure 5:
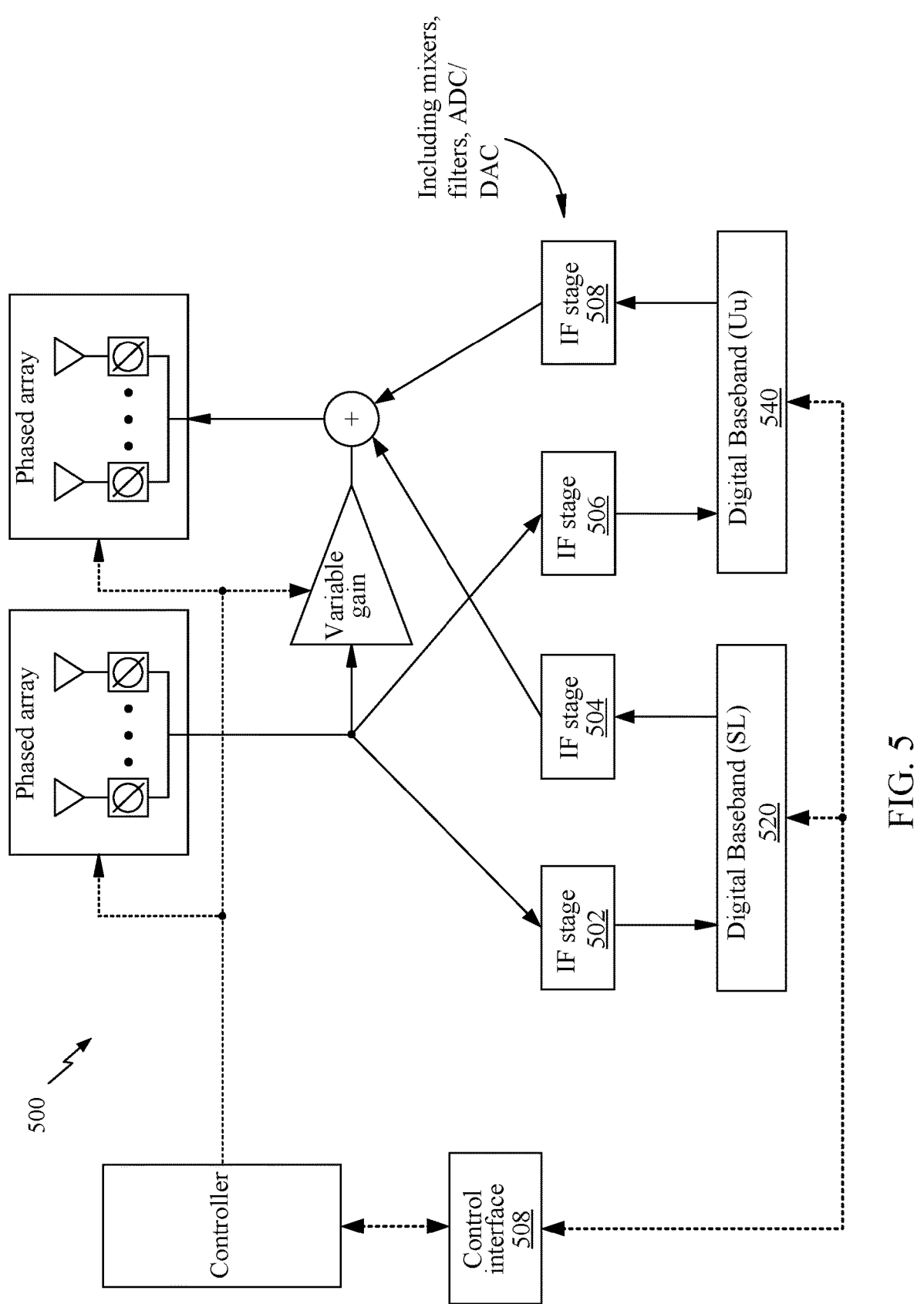
FIG. 5 is a block diagram of an example architecture for a directional repeater, in accordance with certain aspects of the present disclosure.

FIG. 5 shows an example architecture 500 for a L1 relay (for example, a smart repeater, or simply denoted as "repeater", e.g., REP1 or REP2 as of FIG. 4), in accordance with aspects of the present disclosure. As illustrated, the smart repeater may have additional components when compared to a base L1 (layer 1) relay architecture, where the repeater simply amplifies the received RF signal and forwards the RF signal to become the transmitted RF signal (amplify-and-forward). The additional components may allow the smart repeater, for example, to perform beamforming for receiving and/or transmitting RF signals.

As illustrated, the smart repeater of FIG. 5 may have components that may allow the smart repeater to perform at least limited baseband processing. Such components may include a digital baseband (BB) processor 520 for the sidelink between the repeater and another sidelink device (such as a UE 115, in particular UE 112, 114, 116 or 118 of FIG. 1) and optionally a baseband (BB) processor 540 for the Uu link between a UE (such as a UE 115, in particular UE 112, 114, 116 or 118 of FIG. 1) and a gNB (with at least limited baseband capability, for example, relative to a sidelink device, UE or gNB). The components of the smart repeater may also include intermediate frequency (IF) stages (for example, a first IF stage 502, a second IF stage 504, a third IF stage 506 and a fourth IF stage 508) including mixers, filters, analog-to-digital converters (ADCs), digitalto-analog converters (DACs), and the like designed to convert a received RF signal to an IF signal, take and store digital (IQ) samples, and generate the RF signal from the stored digital samples. For this purpose, the smart repeater may include at least sufficient storage to implement a buffer to store the IQ samples.

The smart repeater of FIG. 5 may also include a control interface 508 to receive, demodulate and decode control signaling. In aspects of the present disclosure, the digital BB processor 520 for the sidelink may be used to extract control information received from a sidelink device (such as UE 115, in particular UE 112, 114, 116, or 118 in FIG. 1) via a sidelink to control the configuration of the repeater. The flow of control information is illustrated in FIG. 5 as dashed lines. In optional aspects, the control interface may be configured to receive, demodulate and decode signals of the Uu link via a digital BB processor 540 for the Uu link. In some aspects, the smart repeater does not include a digital BB processor 540 for the Uu link.

In an aspect, the smart repeater may include at least one phased array antenna for receiving directional signals (e.g., receive beams), and a phased array for transmitting directional signals (e.g., transmit beams). The configuration may include a band, a bandwidth part (BWP), or a frequency range at which the smart repeater may receive, amplify and transmit (i.e., forward) signals associated with an Uu link, a band, a bandwidth part (BWP), or a frequency range at which the smart repeater may receive and transmit signals associated with a sidelink, wherein the sidelink signals and the Uu link signals may be on different bands or bandwidth parts within a same frequency range. The repeater may therefore amplify and forward uplink and downlink signals of a Uu link. Furthermore, the repeater may receive signals on a sidelink (such as control signals), and transmit signals on a sidelink (such as feedback signals or sequences). The smart repeater may not have an implementation of a full communications stack. In particular, for reasons of simplicity, the repeater may not have upper layer protocol stacks implemented, such as MAC, PLC, PDCP or application layer. In aspects, the repeater may be configured to decode sequences and signals (such as control signals) on the physical layer associated with the sidelink via IF stage 502, so as to perform the functionality as described herein.

In some implementations, the digital BB processor 520 or 540 may produce an output to an IF stage (for example, to the second IF stage 504 or to the fourth IF stage 508) that gets summed via branches with a respective analog transmit path. These branches may be used to sum the signal coming from a gNB (and going to a UE) with any locally generated signal that the smart repeater has to concurrently send to a UE. In aspects, the smart repeater may transmit a sidelink signal (such as a feedback signal or sequence) concurrently with an Uu signal originating from a gNB forwarded on the downlink towards a UE. In other aspects, the smart repeater may receive a sidelink signal (e.g., including configuration information for the repeater) via IF stage 502, and concurrently forward Uu link signals towards a gNB. The time duplexing for transmitting and receiving signals on the Uu link, and the time duplexing for transmitting and receiving signals on the sidelink may be managed by the UE. In some aspects, the gNB may be base station 105 of FIG. 1, and the UE may be UE 115, for example, UE 112, 114, 116 and 118 according to FIG. 1.

Figure 6:
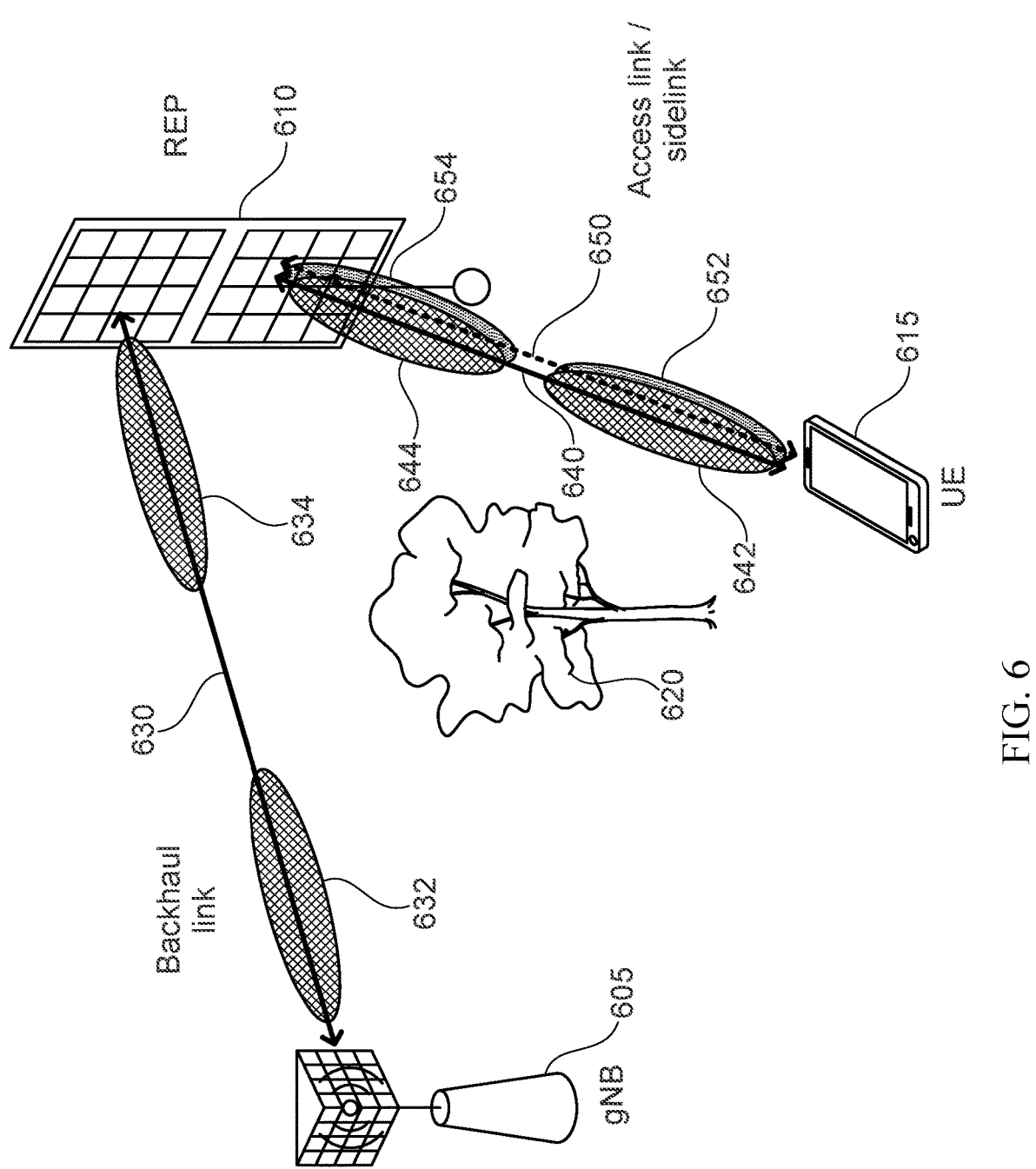
FIG. 6 illustrates an example scenario, in which a smart repeater in accordance with aspects of the present disclosure may be operated.

FIG. 6 illustrates an example scenario in which a smart repeater in accordance with aspects of the present disclosure may be operated. The smart repeater REP may be REP1 402 or REP2 404 according to FIG. 4 (e.g., corresponding to the smart repeater architecture 500 in accordance with FIG. 5). In an aspect, REP may forward signals of a Uu link from/to gNB 605 (which may correspond to BS 105 of FIG. 1) to/from UE 615 (which may correspond to UE 115, in particular UE 112, 114, 116, 118 of FIG. 1). In an aspect, UE 615 may be represented by a first sidelink device 312, and REP 610 may be represented by a second sidelink device 314 as illustrated in FIG. 3. Further in FIG. 6, the Uu link may be forwarded via backhaul link 630 between gNB 605 and REP 610, and via access link 640 between REP 610 and UE 615, to mitigate blocking of an obstacle 620. Backhaul link 630 may be formed by gNB beam 632 and repeater backhaul link beam 634. Access link 640 may be formed by repeater access link beam 644 and UE beam 642. The backhaul link 630 and the access link 640 may refer to downlink as well as to uplink transmissions between gNB 605 and UE 615. The repeater 610 may be used with both frequency division duplexing (FDD) and time division duplexing (TDD) for the sidelink and the Uu link.

The repeater REP 610 may be controlled via sidelink 650. The sidelink signals and the Uu link signals may be on different bands or bandwidth parts within a same frequency range. In some aspects, the sidelink 650, even though separated from the Uu link in frequency, may utilize the same beams at the repeater 610 and the UE 615 as the access link. There may be thus a quasi-colocation relationship (QCL) between repeater access link beam 644 and the corresponding repeater sidelink beam 654. Furthermore, there may be a QCL between the UE access link beam 642 and corresponding UE sidelink beam 652. In such cases, sidelink beam management may be used for managing access link beams. Repeater 610 may, for example, have one or more antenna arrays for transmitting, and another one or more antenna arrays for receiving. Thus, in these examples, the antenna arrays may be shared for transmissions on backhaul link 630, access link 640, and sidelink 650. In other configurations, repeater 610 may include one or more antenna arrays for transmissions on backhaul link 630, and another one or more antenna arrays for transmissions on access link 640 and/or sidelink 650. In such configurations, e.g., a switching mechanism within repeater 610 may direct signals between antenna arrays and amplifier inputs/outputs for transmitting/receiving on links 630, 640 and 650, respectively.

Controlling the repeater 610 via sidelink by a sidelink-capable UE 615 decouples the repeater from network planning. Repeater 610 may thus be transparent to gNB 605, and appear to gNB 605 as a signal reflecting point (e.g., a wall or a physical scatterer) for the Uu link related signals. In some aspects, the repeater may not be regarded as part of the network-side equipment. Examples of deployment of a smart repeater such as repeater 610 may include mitigation of coverage holes at the user's residence. As another example, repeater 610 may be deployed in a car for communication between a base station 605 and a UE located in the interior. Many other deployment examples are conceivable. In aspects, repeater 610 may provide a radio propagation path via a reflection point in addition to a line-of-sight path between UE 615 and gNB 605 (not shown in FIG. 6) to facilitate additional reliability and/or diversity enhancement of the Uu link. In some aspects, the number of repeater backhaul link beams and repeater access link beams may be the same, or different. In a non-limiting example, repeater 610 supports a single access link (or sidelink) beam (or fix directional antenna pattern) of relatively large width (e.g., of an omnidirectional configuration, of 360 degrees or less, 180 degrees, 120 degrees, etc.). This may be sufficient to enhance network coverage for deployments in which the distance between UE 615 and the repeater 610 is relatively short compared to the distance between repeater 610 and gNB 605.

FIG. 7 illustrates example operations that may be performed by a first sidelink device, to discover a second sidelink device, in accordance with certain aspects of the present disclosure. In some aspects, the first and second sidelink devices may be sidelink-capable UEs, such as UE 115, in particular one of UEs 112, 114, 116, 118 of FIG. 1. Furthermore, the first and second sidelink devices may be as described accordance with UEs 212 and 214 of FIG. 2, UEs 312 and 314 of FIG. 3, UEs 410 and 412 of FIG. 4, and UE 615 of FIG. 6. In some optional aspects, the first sidelink device may be a sidelink-capable UE, in accordance with the UEs of FIGS. 1-6 as mentioned, while the second sidelink device may be a repeater (such as repeater 402 and 404 of FIG. 4 and repeater 610 of FIG. 6, e.g., having an architecture 500 as illustrated in FIG. 5) that is configurable to forward signals associated with a Uu link between the first sidelink device and a base station, such as a gNB.

Operations 700 begin, at 702, by transmitting a discovery sequence during a first slot of one or more first slots. At 704, the first sidelink device monitors for a discovery reply sequence from a second sidelink device during an associated second slot, wherein the associated second slot is a first number of slots later than the first slot. At 706, in response to detecting a discovery reply sequence during the associated second slot, the operation continue by determining an indication of acceptance or an indication of rejection of service with the second sidelink device based on the detected discovery reply sequence. By using a discovery sequence and a reply sequence, less resources are occupied, compared to a conventional technique of transmitting and searching for sidelink synchronization signal burst sets (S-SSBs). Furthermore, less interference to other sidelink devices is caused or suffered from other sidelink devices by using a discovery sequence/discovery reply sequence. Moreover, the first sidelink device monitors for a response to the discovery during an associated second slot, which is the first number of slots later than the slot in which the discovery sequence was transmitted. In this way, association of the discovery reply sequence with the transmitted discovery sequence is achieved. Furthermore, the first sidelink device may receive a confirmation or rejection of whether a service of the second sidelink device is available. In some aspects, the service may be pre-determined based on the particular discovery/discovery reply sequence. As an example, the service may be associated with a repeater. In some aspects, the first number of slots and other parameters associated with the communication of the first and second sidelink devices may be part of one or more resource pools defining sidelink resources for the first and second sidelink device. Thus, a first sidelink device desiring a specific service may use discovery according to operations 700. In an aspect, a resource pool may be pre-configured for sidelink communication outside network coverage. In another aspect, a sidelink device that is under network coverage may be configured with parameters needed for sidelink communication, including resource pools.

Additionally or alternatively, the discovery sequence transmitted during the first slot may be transmitted towards a first beam associated with the first slot. In such cases, the monitoring for the discovery reply sequence may be directed towards the first beam. In an aspect, the first beam may be a fix (or static) beam (e.g., an omni-directional beam, a beam covering a wide sector less than 360 degrees of, for example, 180 or 120 degrees). In other aspects, the first beam may include a variable directional pattern, e.g., part of a number of different beams, each of which pointing towards a different direction, or pre-known from a previous communication with the second sidelink device.

Additionally or alternatively, the associated second slot may be of one or more second slots respectively associated with the one or more first slots, the one or more second slots non-overlapping with the one or more first slots. In addition, operations 700 may optionally further comprise transmitting at least one further discovery sequence during at least one further first slot of the one or more first slots, wherein the at least one further discovery sequence transmitted during the at least one further first slot is transmitted towards at least one further first beam associated with the at least one further first slot. Optionally, operations 700 may further comprise a step of monitoring for a discovery reply sequence during the at least one associated further second slot of the one or more second slots, wherein the at least one associated further second slot is the first number of slots later than the respective at least one further first slot, wherein the monitoring is directed towards the further first beam, and in response to detecting the discovery reply sequence during the at least one associated further second slot, determining an indication of acceptance or an indication of rejection of service with the second sidelink device based on the detected discovery reply sequence during the associated at least one further second slot. The first sidelink device may thus perform a beam sweep by transmitting one or more discovery sequences towards different beam directions to establish a beam pair link with a second sidelink device. The first sidelink device can assign each response transmission to a particular transmitted beam, in that the first sidelink device monitors for a reply sequence the first number of slots later than the corresponding discovery sequence transmission. Further optionally, the first sidelink device may repeat said steps (e.g., for a beam sweep) to enable a second sidelink device to direct receive beams towards different beam directions. In some cases, a limitation may be imposed on the number of repeated beam sweeps for the first sidelink device.

Additionally or alternatively, transmitting the discovery sequence may include transmitting the discovery sequence over resources of one or more OFDM symbols, each using one or more resource blocks (RB). As mentioned, the resources (e.g., OFDM symbols or resource blocks, etc.) may be defined in a resource pool available to the first and second sidelink devices. Additionally or alternatively, transmitting the discovery sequence may include transmitting the discovery sequence on resource elements of a single OFDM symbol that includes the resource elements of a physical sidelink feedback channel (PSFCH). In such aspects, the resource elements of the discovery sequence may not overlap, partially overlap or fully overlap with the resource elements that are configured for PSFCH. In the latter case, same resource elements as the resource elements that are configured for PSFCH may be used. In this way, the sidelink discovery sequence is transmitted in a defined OFDM symbol (e.g., second last symbol of a sidelink slot) and/or on defined resources, so that the amount of resources in which the second device may monitor for the discovery sequence may be limited.

Furthermore, regular PSFCH uses sequences that are strongly protected. Thus, a discovery sequence transmission may have limited interference impact on other sidelink transmissions. In some aspects, the discovery sequence is a sequence orthogonal to the sequences or base sequences used for PSFCH. For example, base sequences used for PSFCH may be the base sequences used for PUCCH format 0. Thus, using a sequence orthogonal to PSFCH (e.g., based on a different constant amplitude zero autocorrelation, CAZAC sequence, such as a Zadoff-Chu sequence) strongly protects the discovery sequence from interference of other sidelinks, and reduces interference impact to other sidelink transmissions.

FIG. 8 illustrates example operations that may be performed by a second sidelink device, to receive a discovery sequence from a first sidelink device, in accordance with certain aspects of the present disclosure. In some aspects, the first and second sidelink devices may be sidelink-capable UEs, such as UE 115, in particular one of UEs 112, 114, 116, 118 of FIG. 1. Furthermore, the first and second sidelink devices may be as described accordance with UEs 212 and 214 of FIG. 2, UEs 312 and 314 of FIG. 3, UEs 410 and 412 of FIG. 4, and UE 615 of FIG. 6. In some aspects, the first sidelink device may be a sidelink-capable UE, in accordance with the UEs of FIGS. 1-6 as mentioned, while the second sidelink device may be a repeater (such as repeater 402 and 404 of FIG. 4 and repeater 610 of FIG. 6, e.g., having an architecture 500 as illustrated in FIG. 5) that is configurable to forward signals associated with a Uu link between the first sidelink device and a base station, such as a gNB.

Operations 800 begin, at 802, by monitoring for a discovery sequence during one or more first slots. At 804, in response to detecting a discovery sequence from a first sidelink device during a first slot of the one or more first slots, the second sidelink device may transmit a discovery reply sequence during an associated second slot, wherein the associated second slot is a first number of slots later than the first slot. The discovery reply sequence may include an indication of acceptance or an indication of rejection of service with the second sidelink device. By using a discovery sequence and a reply sequence, less resources are occupied, compared to a conventional technique of transmitting and searching for sidelink synchronization signal burst sets (S-SSBs). Furthermore, less interference to other sidelink devices is caused or suffered from by using a discovery sequence/discovery reply sequence. Moreover, the second sidelink device transmits a response to the discovery sequence detected a first number of slots later than the slot in which the discovery sequence was detected. In this way, association of the discovery reply sequence with the transmitted discovery sequence is accomplished. Furthermore, the second sidelink device may transmit a confirmation or rejection of whether a service of the second sidelink device is available. In some aspects, the service may be pre-determined based on the particular discovery/discovery reply sequence. As an example, the service may be associated with a sidelink-controlled repeater. In some aspects, the first number of slots and other parameters associated with the communication of the first and second sidelink devices maybe part of one or more resource pools defining sidelink resources for the first and second sidelink devices. Thus, a second sidelink device offering a service may monitor for discovery sequences. In an aspect, a resource pool may be pre-configured for sidelink communication outside network coverage. In another aspect, a sidelink device that is under network coverage may be configured with parameters needed for sidelink communication, including resource pools.

Additionally or alternatively, monitoring for a discovery sequence during the one or more first slots may include directing a receive beam direction towards a first receive beam during the one or more first slots. In some optional aspects, the one or more first slots may cover a monitoring interval of at least two times the first number of slots. In addition, operations 800 may optionally further comprise in response to detecting the discovery sequence during the first slot of the one or more first slots, transmitting the discovery reply sequence towards the first receive beam. In some further optional aspects, in response to not detecting any discovery sequence during the one or more first slots, the second sidelink device may direct a receive beam direction towards a second receive beam and monitor for a further discovery sequence during further one or more first slots, wherein the further one or more first slots are within a further monitoring interval. By monitoring for a discovery sequence while directing a receive beam towards the first beam direction, the second sidelink device scans or monitors towards a particular direction while the first device may sweep directions. In particular, the first device may sweep directions for at most the first number of slots. Thus, a complete first device sweep is fetched when keeping the receive beam constant and scanning for a monitoring interval of at least two times the first number of slots, even when the monitoring interval at the second device is not synchronized with the sweeping interval at the UE.

Additionally or alternatively, detecting the discovery sequence may include comparing a receive power of the discovery sequence with a threshold, wherein the discovery sequence is determined to be detected when the receive power is above the threshold. By detecting the discovery sequence based on a threshold, only those beams are considered by the second sidelink device that are received with sufficient power.

Additionally or alternatively, detecting the discovery sequence may include detecting presence of at least one further discovery sequence during at least one further slot of the one or more first slots, determining that the discovery sequence associated with the first slot has strongest receive power, and transmitting the discovery reply sequence only during the associated second slot. Therefore, in case more than one suitable beams are detected, the second sidelink device may select the one having strongest power, which is then the most suitable beam for communication with the first device.

Additionally or alternatively, detecting the discovery sequence may include receiving the discovery sequence over resources of one or more OFDM symbols, each using one or more resource blocks (RB). Additionally or alternatively, detecting the discovery sequence may include receiving the discovery sequence on resource elements of a single OFDM symbol that includes the resource elements of a physical sidelink feedback channel (PSFCH). In some optional aspects, the resource elements of the discovery sequence may fully overlap with the resource elements that are configured for a PSFCH. In further alternative aspects, the discovery sequence is a sequence orthogonal to the base sequences used for PSFCH transmission. In some further optional aspects, the discovery reply sequence may be the same sequence as the discovery sequence. In these aspects, the discovery reply sequence may have the same properties as the discovery sequence. In other aspects, the discovery reply sequence may include transmitting the discovery reply sequence on resource elements of a single OFDM symbol that includes the resource elements of a physical sidelink feedback channel (PSFCH). In some optional aspects, the resource elements of the discovery reply sequence may fully overlap with the resource elements that are configured for a PSFCH. In additional alternative aspects, the discovery reply sequence is a sequence orthogonal to the base sequences used for PSFCH transmission.

Figure 9:
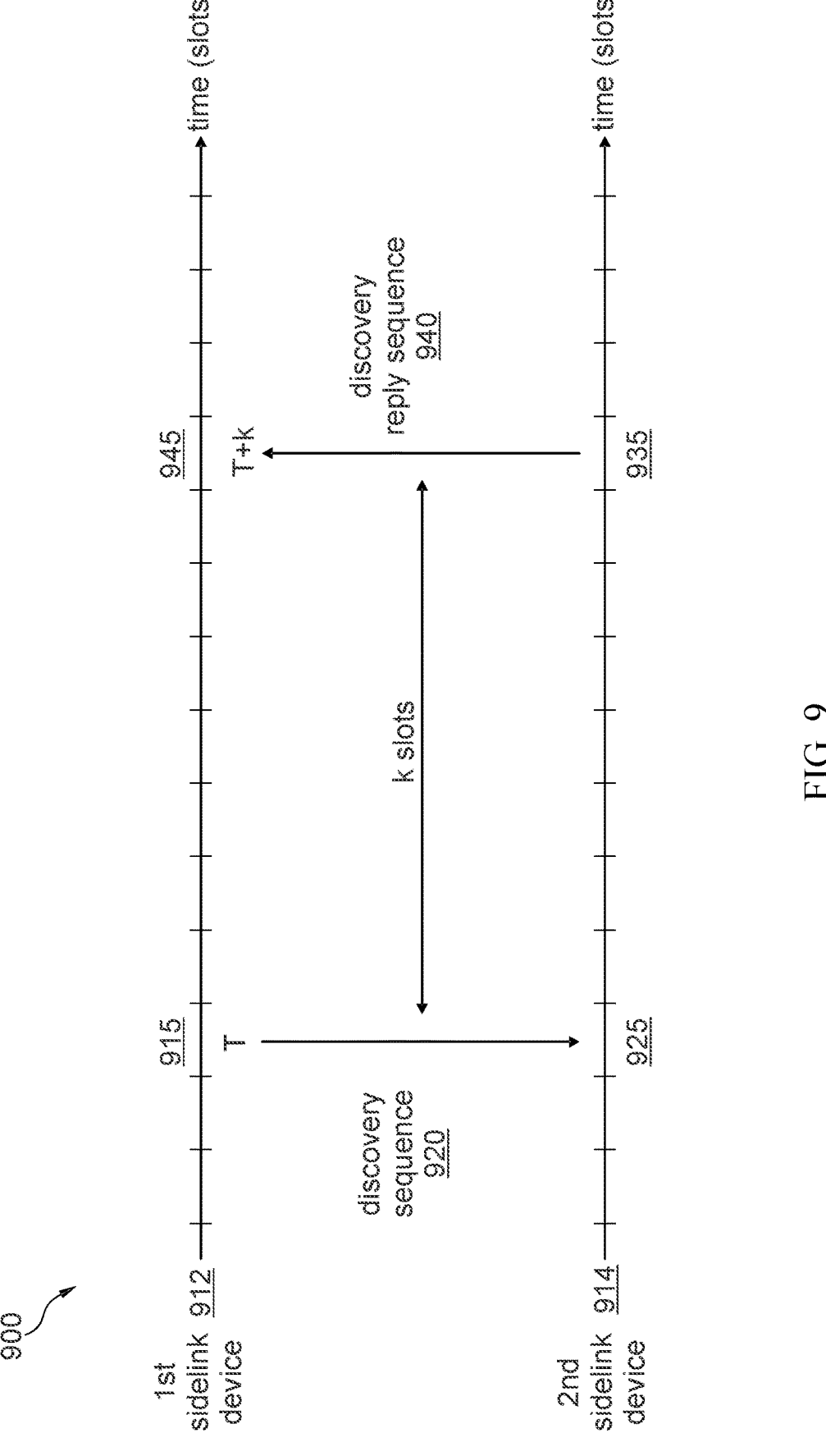
FIG. 9 illustrates an exemplary timeline of a discovery process involving a first sidelink device and a second sidelink device, in accordance with certain aspects of the present disclosure.

FIG. 9 illustrates an exemplary timeline 900 of a discovery process involving a first sidelink device 912 and a second sidelink device 914, in accordance with certain aspects of the present disclosure. In some aspects, the first and second sidelink devices may follow the example operations as provided in accordance with FIGS. 7 and 8. The first sidelink device 912 may use a default resource pool for sidelink communication. In case the first sidelink device 912 has network coverage, a resource pool provided by the network may be used, as known by persons of ordinary skill in the art. First and/or second sidelink devices may use sidelink synchronization via a cellular network (if present), or may obtain sidelink synchronization through a global navigation satellite system (GNSS).

In operation, at 915, first sidelink device 912 may transmit, during a first slot (e.g., slot T), a discovery sequence, 920. In some aspects, at 925, the second sidelink device 914 may monitor for discovery sequences and detect the transmitted discovery sequence 920 during slot T. In some aspects, the first sidelink device 912 may transmit the discovery sequence 920 over resources of one or more OFDM symbols associated with the first slot (e.g., slot T), each using one or more resource blocks (RB). In aspects, the first sidelink device 912 may transmit the discovery sequence 920 on resource elements of a single OFDM symbol that includes the resource elements of a physical sidelink feedback channel (PSFCH). The resource elements of the discovery sequence may not overlap at all, partially overlap or fully overlap with the resource elements that are configured for the PSFCH. In some aspects, the discovery sequence is different from a physical sidelink feedback channel PSFCH base sequence, a sidelink synchronization sequence (S-SS) and a primary/secondary synchronization (PSS/SSS) sequence. In some aspects, the discovery sequence is orthogonal to PSFCH sequences or base sequences used in the PSFCH. By using a discovery sequence, the transmission may not interfere with other sidelink communications, or may at least not substantially interfere with other sidelink communications. In some cases, before transmitting the discovery sequence, the first sidelink device may refrain from performing sensing and resource selection, to accelerate access to the medium.

Upon detecting (at 925) the discovery sequence 920 transmitted by the first sidelink device 912, the second sidelink device 914 may transmit, at 935, a discovery reply sequence 940. In aspects, the second sidelink device 914 may transmit the discovery reply sequence 940 during an associated second slot (e.g., in slot T+k), wherein the associated second slot is a first number of slots (e.g., k slots) later than first slot T. Thereby, a discovery sequence 920 and a discovery reply sequence 940 are associated with a fixed time interval of k slots. The parameter k may be preconfigured to the first and second sidelink devices, for example, as part of a resource pool configuration.

At 925, the second sidelink device 914 may also determine whether it accepts or rejects a service associated with the second sidelink device. In some aspects, the kind or type of service may be pre-configured and associated with the discovery sequence, i.e., a first discovery sequence may be used for the first service, and a second discovery sequence may be used for a second service, etc. In some aspects, the service may be associated with a sidelink-controlled repeater. The determination may be based on whether the service is available at the second sidelink device. For example, the second sidelink device may assess whether a limitation on the number of users for a service is exceeded.

The discovery reply sequence 940 may include an indication of acceptance or an indication of rejection of service with the second sidelink device. The indication may be based on any kind of modification of the discovery reply sequence, such as modulating or shifting a base sequence. Furthermore, a first sequence used as discovery reply sequence may be used to indicate that the service is available, and a second sequence used as discovery reply sequence may be used to indicate that the service is rejected, where first and second sequences may be derivable from a base sequence.

At 945, the first sidelink device 912 may monitor for a discovery reply sequence within slot T+k, i.e., a first number of slots after transmission of the discovery sequence. In some instances, the first sidelink device 912 may detect the discovery reply sequence 940. Thereby, the first sidelink device 912 is aware of the presence of second sidelink device 914. Furthermore, the first sidelink device 912 is aware of whether a service requested by the first sidelink device 912 is accepted or rejected by the second sidelink device 914. In case service is rejected by the second sidelink device 914, the first sidelink device may refrain from repeatedly attempting to discover sidelink devices. On the other hand, when, at 945 the first sidelink device does not detect a discovery reply sequence, it may repeat discovery attempts, possibly within neighboring timeslots. Transmission of signals associated with the discovery is thereby limited to a short time period. It is thus not necessary for the first or second sidelink device to permanently advertise presence.

Figure 10:
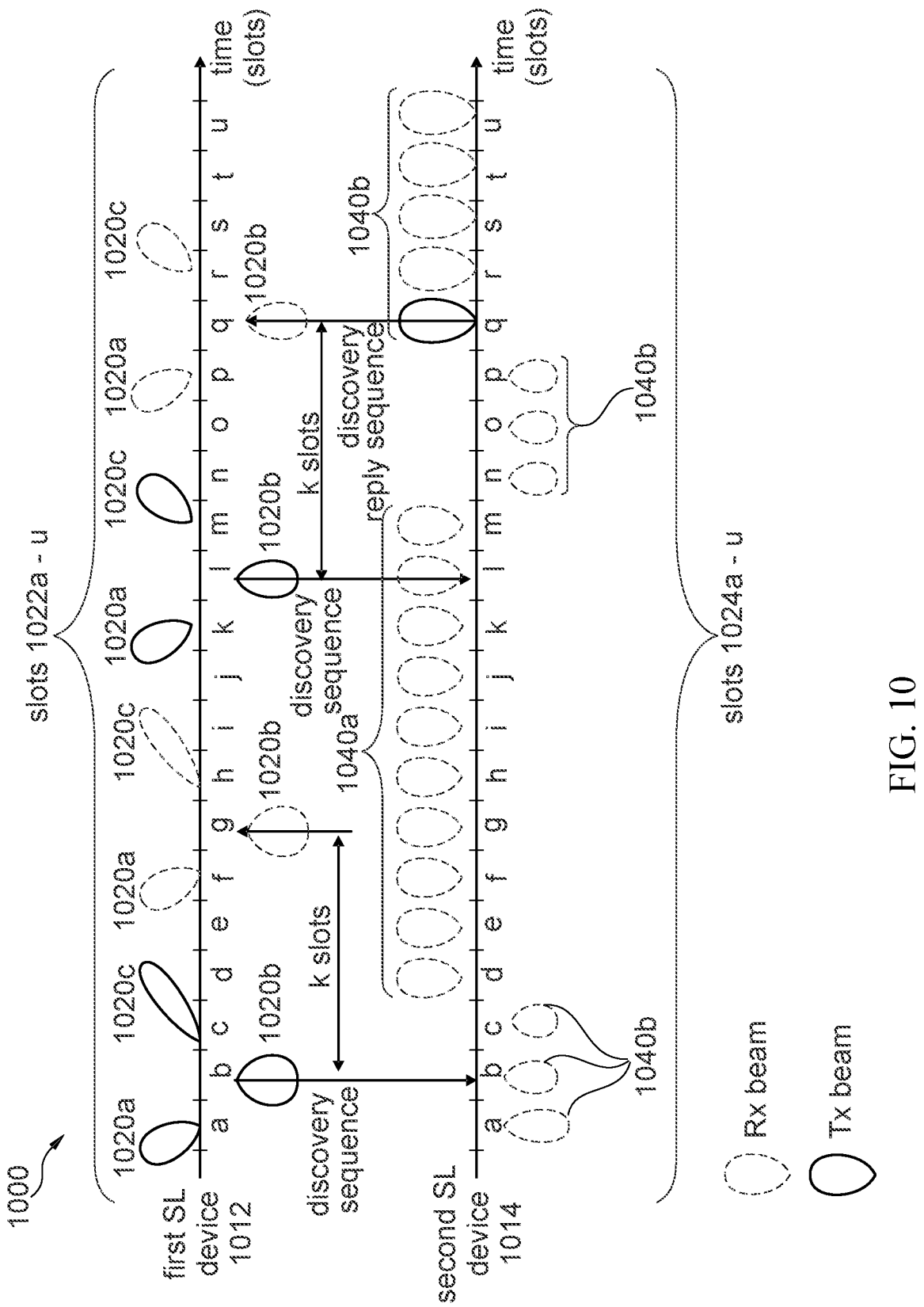
FIG. 10 illustrates a further exemplary timeline of the discovery process involving a first sidelink device and a second sidelink device in accordance with certain aspects of the disclosure.

FIG. 10 illustrates a further exemplary timeline 1000 of the discovery process involving a first sidelink device 1012 and a second sidelink device 1014 in accordance with certain aspects of the disclosure. In some aspects, the first and second sidelink devices may follow the example operations as provided in accordance with FIGS. 7 and 8. Furthermore, aspects of the timeline 1000 are in accordance with timeline 900 of FIG. 9.

In this example, first sidelink device 1012 may be configured to form three different transmit and receive beams 1020*a*, 1020*b*, and 1020*c*, as illustrated in FIG. 10. Furthermore, in this example, second sidelink device 1014 may be configured to form two transmit and receive beams 1040*a* and 1040*b* as illustrated in FIG. 10. In this example, a first number of slots is k=5. It should be noted that values and other aspects used in this example are for illustration only and not to be construed as preferred or advantageous over other values and other aspects.

In operation, the first sidelink device 1012 may transmit a beam sweep using beam 1020*a* in slot 1022*a*, beam 1020*b* in slot 1022*b*, and beam 1020*c* during slot 1022*c*. The first sidelink device 1012 may monitor for a discovery reply sequence during associated slots 1022*f,* 1022*g,* and 1022*h*, where it uses beams 1020*a*, 1020*b* and 1020*c*, respectively, in receive direction. Note that associated slots 1022*f* and 1022*a*, slots 1022*b* and 1022*g*, as well as slots 1022*c* and 1022*h* are respectively the first number of slots later (i.e., k slots later).

The second sidelink device 1014 may monitor for a discovery sequence during slots 1024. In case no discovery sequence is detected during one slot, it may monitor the next slot as well. Furthermore, for monitoring, the second sidelink device 1014 may keep a beam constant during a monitoring interval of at least two times the first number of slots (i.e., 2 k slots). By keeping a receive beam constant during monitoring, the second sidelink may assure that it fetches at least one of the beams transmitted by the first sidelink device during a sweep, when the receive beam at second sidelink device is appropriate. Note that when using such monitoring interval of at least two times the first number of slots, the second sidelink device may detect a beam even when the monitoring intervals of the second sidelink device are not aligned with the transmit/monitoring intervals of the first sidelink device.

Turning back to FIG. 10, second sidelink device 1014 may thus monitor during slots 1024*a-c* using receive beam 1040*b* (second sidelink device 1014 may have started using receive beam 1040*b* within a monitoring interval, e.g., seven slots before slot 1024*a*, not shown in FIG. 10). While the first sidelink device may transmit beam 1020*b* towards the second sidelink device during slot 1022*b*, the second sidelink device, however, may have directed receive beam 1040*b*, which does not conform with transmit beam 1020*b*. Thus, second sidelink device 1014 may not detect the transmission of the discovery sequence in slots 1022*b*/1024*b*, and therefore may continue monitoring. During slots 1024*d-m*, the second sidelink device may monitor towards beam 1040*a* for 2 k slots.

As first sidelink device 1012 may not have detected a discovery reply sequence during monitoring slots 1022*f-h* (which is k slots after transmission slots 1022*a-c*, respectively), it may start a new sweep in slots 1022*k-1022m*. During slot 1022*l*, the first sidelink device 1012 may transmit towards beam 1020*b*, which conforms with beam 1040*a* at the second sidelink device 1014. The second sidelink device may therefore detect the discovery sequence during slot 1024*l*, and transmit a discovery reply sequence during slot 1024*q* which is the first number of slots (k) later than slot 1024*l*. During the same time interval, within slot 1022*q*, the first sidelink device 1012 may direct a receive beam 1020*b*, which corresponds to the former transmit beam during slot 1022*l*. The first sidelink device may therefore detect the discovery reply sequence, and determine whether it includes an indication of acceptance or an indication of rejection of a service with the second sidelink device.

Thus, the first and second sidelink devices may have mutually discovered presence during timeline 1000. Furthermore, the first and second sidelink devices may be aware of a request and an acceptance of a request for a service. Furthermore, in the present example, the first and second sidelink devices may have established beam conformance (i.e., beam 1020*b* at the first sidelink device, and beam 1040*a* at the second sidelink device) by exchanging discovery sequences and discovery reply sequences. In some examples, the second sidelink device 1014 may, in response to the discovery, direct a receive beam towards the determined beam 1040*a* to monitor for further (control) information from the first sidelink device, which may be transmitted in a physical sidelink control channel (PSCCH).

FIG. 11 illustrates example operations 1100 that may be performed by a user equipment (UE), to configure a repeater, in accordance with certain aspects of the present disclosure. In some aspects, the UE may be a sidelink-capable UE, such as UE 115, in particular one of UEs 112, 114, 116, 118 of FIG. 1. Furthermore, the UE may be as described accordance with UEs 212 and 214 of FIG. 2, UEs 312 and 314 of FIG. 3, UEs 410 and 412 of FIG. 4, and UE 615 of FIG. 6. In some aspects, the repeater (such as repeater 402 and 404 of FIG. 4 and repeater 610 of FIG. 6, e.g., having an architecture 500 as illustrated in FIG. 5) may be configurable to forward signals associated with a Uu link between the first sidelink device and a base station, such as a gNB.

Operations 1100 begin, at 1102, by transmitting, sidelink control information associated with a repeater (SCI-R) on a physical sidelink control channel (PSCCH), the sidelink control information including repeater configuration information. At 1104, the UE may start a timer for measuring an expiry time interval based on transmitting the SCI-R. The sidelink control information may be transmitted to a repeater. At 1106, the UE may receive, within the expiry time interval, physical sidelink feedback channel (PSFCH) information, wherein an ACK indicates that a configuration of the repeater according to the configuration information is granted, and wherein a NACK indicates that the configuration of the repeater is not granted. The UE may determine a failure to decode the SCI-R at the repeater based on expiry of the timer.

The operations according to the present disclosure facilitates configuration of a repeater by a UE that may use the repeater for forwarding a Uu link between the UE and a network access node, such as a gNB. While operation of conventional repeaters may be transparent to a UE (e.g., the repeaters appear for a UE as network access nodes, repeaters are subject to network planning, etc.), the operations according to the present disclosure may provide a repeater that is transparent to access nodes of network. In some examples, it may not necessary that the network (e.g., a gNB) supports or is configured for sidelink communications. Furthermore, the UE may use a dedicated information element (e.g., sidelink control information associated with a repeater, SCI-R) for transmitting repeater configuration information. As known by persons of skill in the art, sidelink control information (SCI) may include 1st-stage SCI (e.g., SCI carried on PSCCH), and 2nd-stage SCI (e.g., SCI carried on PSSCH). In this respect, a standalone SCI-R may be used, transmitting control information only. A standalone SCI-R may include, for example, a 1st stage SCI format only, transmitted on PSCCH, which does not include transmission of a PSSCH and a 2nd stage SCI. In some examples, sidelink control information may be transmitted using a 1st stage SCI format and/or a 2nd stage SCI format transmitted on PSSCH. In some aspects, no sidelink shared channel data needs to be transmitted. Thus, sensing and/or resource selection for transmission of SCI-R may be simplified, or may be not necessary. Furthermore, the sidelink feedback channel information received from the repeater is used as a grant or a rejection of the requested configuration by the repeater. Thus, when an "ACK" is received by the UE, the UE has a confirmation that the repeater honors the configuration, while the UE becomes aware by a "NACK" that the particular configuration cannot be granted (e.g., as a maximum number of users already communicate with the repeater, a requested configuration not supported by the repeater, etc.). In case of a "NACK", the UE may not retry the same repeater configuration information. Moreover, an expiry timer (e.g., started upon SCI-R transmission) is used to determine at the UE's end without reception of PSFCH information that a failure to decode the SCI-R at the repeater based on expiry of the timer has occurred. In this way, the UE is aware about a failure to decode the SCI-R. In case of a decoding failure, the UE may retry the transmission of the repeater configuration information.

Additionally or alternatively, the repeater configuration information may include at least one of: one or more indications that signals are to be forwarded by the repeater in the downlink, one or more indications that signals are to be forwarded by the repeater in the uplink, one or more indications of a frequency range or bandwidth part (BWP) of signals to be forwarded by the repeater, one or more indications of forwarding time intervals of signals to be forwarded by the repeater, an indication of a repeater backhaul link beam sweep or backhaul link beam switch to be performed during one or more forwarding time intervals, and/or an indication of a feedback opportunity for the repeater to indicate whether or not the request is granted.

Thus, the repeater configuration information may configure a repeater to forward signals in the downlink and/or uplink directions, e.g., at specific time intervals. Furthermore, the configuration information may indicate a frequency range or a bandwidth part that maybe used by the repeater for forwarding the Uu link. For example, the UE may configure a repeater to forward some specific bands or bandwidth parts of the Uu link. In another example, the UE may configure a repeater to forward some specific bands or bandwidth parts by the repeater for performing cell search, or a neighbor cell measurement. In some aspects, the repeater configuration information may include an indication of a repeater backhaul link (i.e., link between repeater and network node, such as a gNB) beam sweep or backhaul link beam switch to be performed during one or more forwarding time intervals. This may be useful to control backhaul beams of the repeater when transmitting or repeating towards the network (e.g., on the backhaul link). In some aspects, the repeater configuration information may include an indication of the feedback opportunity. In some examples, the feedback opportunity may be determined at the UE in accordance with a resource pool. In some examples, the feedback opportunity may be determined in accordance with an expiry time interval determined at the UE.

Additionally or alternatively, the SCI-R may be transmitted on the PSCCH without a physical sidelink shared channel (PSSCH). In some of such aspects, only 1st stage SCI information is included as SCI-R. Thereby, an amount of repeater configuration data may be transmitted without performing resource selection. Additionally or alternatively, the SCI-R is transmitted on the PSCCH, the transmission including a physical sidelink shared channel (PSSCH). In some of such aspects, 1st stage SCI information and 2nd stage SCI information is included as SCI-R. By using a PSSCH, a larger amount of repeater configuration data may be transmitted, for example, to establish a basic configuration or reconfiguration of the repeater. In some aspects, the 1st stage SCI information may not include repeater configuration information, while repeater configuration information is included in 2nd stage SCI information.

Additionally or alternatively, the repeater configuration information may include a request to forward downlink signals, and the UE receives an ACK as PSFCH information. By receiving an ACK from the repeater, the UE is aware that the request to forward downlink signals is honored by the repeater. In some examples, the UE may thereby request to forward downlink signals to perform an initial cell search or some other idle mode tasks. Additionally or alternatively, the request to forward downlink signals may include at least one of a frequency range, an indication of a repeater backhaul receive beam, or an indication of a repeater backhaul receive beam sweep. In an example, such request may be useful to perform initial cell search at the UE via the repeater, e.g., to scan for a system synchronization block (SSB) from a gNB or other network node. In some examples, the repeater may use beamforming on the backhaul link between the repeater and a gNB. In some of such examples, the repeater may be requested to direct receive beams towards different directions for receiving SSB burst sets from a gNB.

Additionally or alternatively, operations 1100 may further comprise in response to receiving at least one system synchronization block (SSB) from a gNB via the repeater, determining a repeater backhaul beam based on the received at least one SSB, selecting a RACH resource, transmitting SCI-R via the sidelink including a request to the repeater based on the determined repeater backhaul beam to forward uplink signals based on the selected RACH resource, and to forward downlink signals based on resources associated with a RACH response, transmitting a RACH on the selected RACH resource, and monitoring for a RACH response message. In some of such examples, the UE may control a repeater to perform an initial network access procedure using a RACH, after having successfully received at least one system synchronization block (SSB) from a gNB. In some instances, the UE may determine or select a repeater backhaul beam based on the received SSB. The UE may select a beam according to a strongest SSB (e.g., based on received signal receive power, RSRP), and select a RACH resource corresponding to the beam associated with the selected SSB. In some instances, the UE may receive further or remaining system information. For example, based on the system information, the UE may recognize one or more TDD configurations associated with the Uu link. This information may be used by the UE to manage the time duplexing at the repeater. Thus, in some examples, repeater configuration information related to uplink/downlink time intervals may be aligned with a TDD configuration. In some examples, the UE may transmit SCI-R based on the determined repeater backhaul beam to establish beam conformance with the gNB. The SCI-R may include a time interval for transmission in conformance with the selected RACH resource. The SCI-R may include a time interval for receiving a RACH response. The UE may thus transmit a RACH and monitor for a RACH response message on the Uu link having the repeater appropriately configured. In this way, a UE may control a repeater to perform a RACH procedure.

Additionally or alternatively, the UE may be in RRC connected state with a network including a gNB, and a request to forward downlink signals is based on a repeater backhaul beam, and based on at least one of a frequency range of resources configured by the gNB for downlink transmissions to the UE, or for a frequency range configured for uplink resources. Thus, the UE may control a repeater to forward the uplink and downlink signals to/from a gNB during a radio resource control (RRC) connection. In some instances, the uplink resources may include one or more resources on which uplink transmissions corresponding to system information received from the network may occur. For example, for FDD, the request may include an uplink FDD frequency range and a downlink FDD frequency range. In other examples, the same frequency range as used for the downlink may also be used for the uplink. Such examples may include TDD. Furthermore, one or more repeater backhaul beams (i.e., beams used on the backhaul link between the repeater and the gNB) may be included in the request. In this way, the UE controls the repeater, taking into account that beam steering towards the gNB is performed at the repeater. While the UE controls the repeater by receiving control information from the network and forwarding corresponding repeater configuration information via sidelink to the repeater, the signal processing capability at the repeater side can be kept low. In some examples, the repeater may not need to demodulate and process any signals related to the Uu link, besides amplifying and forwarding them on uplink and/or downlink.

Additionally or alternatively, operations of the UE may further comprise receiving a downlink transmission from the gNB indicating that a beam refinement or a beam switch is to be performed, and transmitting SCI-R via the sidelink including a request to the repeater to perform the indicated refinement or switch of the repeater backhaul beam. In this way, while the UE is connected with its Uu interface with the repeater via an access link between the UE and the repeater, and further connected via a backhaul link between the repeater and a gNB, the UE can receive control commands for performing beam management, and control the repeater appropriately via sidelink to perform the beam management requested from the network. Additionally or alternatively, the further SCI-R may include fields to indicate at least one of a number of beams to be measured, at least one slot associated with each beam, an indication of whether the beam is to be refined or switched, and/or a direction of the measurements.

Additionally or alternatively, operations of the UE may further comprise receiving a downlink transmission from the gNB indicating that gain control is to be performed, and transmitting SCI-R via the sidelink including a request to the repeater to perform the indicated gain control of the repeater backhaul beam. In some of such examples, the UE may thus perform power control via the repeater. To this end, the UE may receive a downlink transmission from the gNB indicating that power control measurements is to be performed. The UE may translate the power control measurements into a channel gain to be applied at the repeater, and transmit SCI-R via the sidelink including a request to the repeater to perform the power control measurement of the repeater backhaul beam. Additionally or alternatively, the SCI-R may include fields to indicate at least one of the number of measurement instances, and/or an increase or update step size of the power at the repeater.

Additionally or alternatively, the UE may transmit the SCI-R towards a UE sidelink beam. While in many cases sidelink transmission may not use beamforming (e.g., using a single fix or static beam (or e.g., antenna pattern), which is Omni-directional, or directed towards a wide angle of e.g., 360 degrees or less, 180 degrees, 120 degrees, or 90 degrees, etc.), beamforming may be applied in some cases on the sidelink/Uu access link between the UE and the repeater as well as on the backhaul link between the repeater and the gNB. In some of these aspects, the UE may be configured to perform beam management procedures for the sidelink. In some aspects, there may be a quasi-colocation relationship (QCL) between repeater access link beam and the corresponding repeater sidelink beam. In some of these instances, the UE may control the beams of the repeater on the sidelink/access link using SCI-R signaling as explained above. For example, the UE may transmit repeater configuration information via SCI-R to perform a beam sweep or switch at repeater side for the sidelink. Based on a QCL relationship between the sidelink and the Uu access link, the same beams may be used for the sidelink and the Uu access link.

FIG. 12 illustrates example operations 1200 that may be performed by a repeater, in accordance with certain aspects of the present disclosure. In some aspects, the repeater (such as repeater 402 and 404 of FIG. 4 and repeater 610 of FIG. 6, e.g., having an architecture 500 as illustrated in FIG. 5) may be configurable to forward signals associated with a Uu link between the first sidelink device and a base station, such as a gNB (e.g., as illustrated with repeater 610 in FIG. 6).

Operations 1200 begin, at 1202, by receiving (e.g., from a UE) sidelink control information associated with the repeater (SCI-R) on a physical sidelink control channel (PSCCH), the sidelink control information including repeater configuration information. At 1204, the repeater may determine whether the configuration is granted. At 1206, the repeater may transmit physical sidelink feedback channel (PSFCH) information (e.g., to a UE), wherein an ACK indicates that the configuration of the repeater according to the configuration information is granted, and wherein a NACK indicates that the configuration of the repeater is not granted.

The operations according to this example may facilitate configuration of a repeater by a UE that may use the repeater for forwarding a Uu link between the UE and a network node, such as a gNB. While operation of conventional repeaters may be transparent to a UE (e.g., the repeaters appear for a UE as network access nodes, repeaters are subject to network planning, etc.), the operations according to the present disclosure may provide a repeater that is transparent to the access nodes of the network. In some aspects, the repeater architecture may be simplified in that the Uu link only requires an analog signal path amplify and forward Uu related signals. The repeater may be controllable or configurable on a sidelink by a dedicated information element (e.g., sidelink control information associated with a repeater, SCI-R) for transmitting repeater configuration information, as described above. The repeater may furthermore determine and indicate in response whether the configuration can be granted. Such determination may be made, for example based on a maximum number of users of the repeater, a capability of the repeater, information the repeater has received from the network, etc. In some instances, a maximum time span between receiving the sidelink control information (SCI-R) and the transmission of the feedback may be determined by a standard specification, or may be determined by an indication of a feedback opportunity for the repeater to indicate whether or not the request is granted.

Additionally or alternatively, the repeater configuration information may include at least one of one or more indications that signals are to be forwarded by the repeater in the downlink, one or more indications that signals are to be forwarded by the repeater in the uplink, one or more indications of a frequency range or bandwidth part (BWP) of signals to be forwarded by the repeater, one or more indications of forwarding time intervals of signals to be forwarded by the repeater, an indication of a repeater backhaul link beam sweep or backhaul link beam switch to be performed during one or more forwarding time intervals, and/or an indication of a feedback opportunity for the repeater to indicate whether or not the request is granted.

Additionally or alternatively, the SCI-R may be received on the PSCCH, the transmission including a physical sidelink shared channel (PSSCH). Alternatively, the SCI-R may be received on the PSCCH without a physical sidelink shared channel (PSSCH).

Additionally or alternatively, the repeater configuration information may include a request to forward downlink signals, and the operations may further include determining that the request of the UE is granted, and transmitting an ACK as PSFCH information. Additionally or alternatively, the request to forward downlink signals includes at least one of a frequency range, an indication of a repeater backhaul receive beam, or an indication of a repeater backhaul receive beam sweep. In some such examples, the repeater may thus forward signals from a gNB to enable a UE to perform an initial cell search, or other idle mode tasks.

Additionally or alternatively, the operations of the repeater may further comprise receiving SCI-R via the sidelink including a request to the repeater based on a repeater backhaul beam to forward uplink signals based on a RACH resource, and to forward downlink signals based on resources associated with a RACH response, and performing the requested configurations to forward the uplink and downlink signals. Additionally or alternatively, the request to forward downlink signals may be based on a repeater backhaul beam, and based on at least one of a frequency range of resources for downlink transmissions to the UE, or for a frequency range configured for uplink resources. Such configuration may facilitate a UE to transmit a RACH and monitor for a RACH response message on the Uu link.

Additionally or alternatively, the operations of the repeater may further comprise receiving SCI-R via the sidelink including a request to perform a refinement or switch of the repeater backhaul beam, and performing the requested refinement or switch of the repeater backhaul beam. In this way, the repeater may perform operations of beam management on the backhaul link on behalf of the UE. Additionally or alternatively, the SCI-R may include fields to indicate at least one of: a number of beams to be measured, at least one slot associated with each beam an indication of whether the beam is to be refined or switched, and/or a direction of the measurements.

Additionally or alternatively, the operations of the repeater may further comprise receiving SCI-R via the sidelink including a request to perform a gain control of the repeater backhaul beam, and performing the requested gain control of the repeater backhaul beam. Additionally or alternatively, the SCI-R may include fields to indicate at least one of the number of measurement instances, an increase or update step size of the power at the repeater. In this way, a channel gain may be applied at the repeater to perform the power control measurement of the repeater backhaul beam.

Additionally or alternatively, the SCI-R is received towards a repeater sidelink beam. While in many cases sidelink transmission may not use beamforming (e.g., use a single fix or static beam, or a static antenna pattern, which is omni-directional, or directed towards a wide angle of e.g., 360 degrees or less, 180 degrees, 120 degrees, or 90 degrees, etc.), beamforming may be applied in some cases on the backhaul link as well as on the sidelink/Uu access link between the UE and the repeater. In some of these aspects, the repeater may be configured to perform beam management procedures for the sidelink. In some aspects, there may be a quasi-colocation relationship (QCL) between repeater access link beam and the corresponding repeater sidelink beam.

Figure 13A:
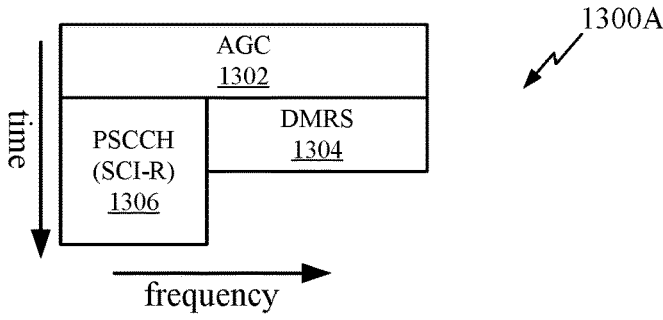
FIG. 13A illustrates an example time/frequency slot structure for communicating repeater configuration information via a standalone sidelink control information (SCI-R) on physical sidelink control channel (PSCCH).
Figure 13:
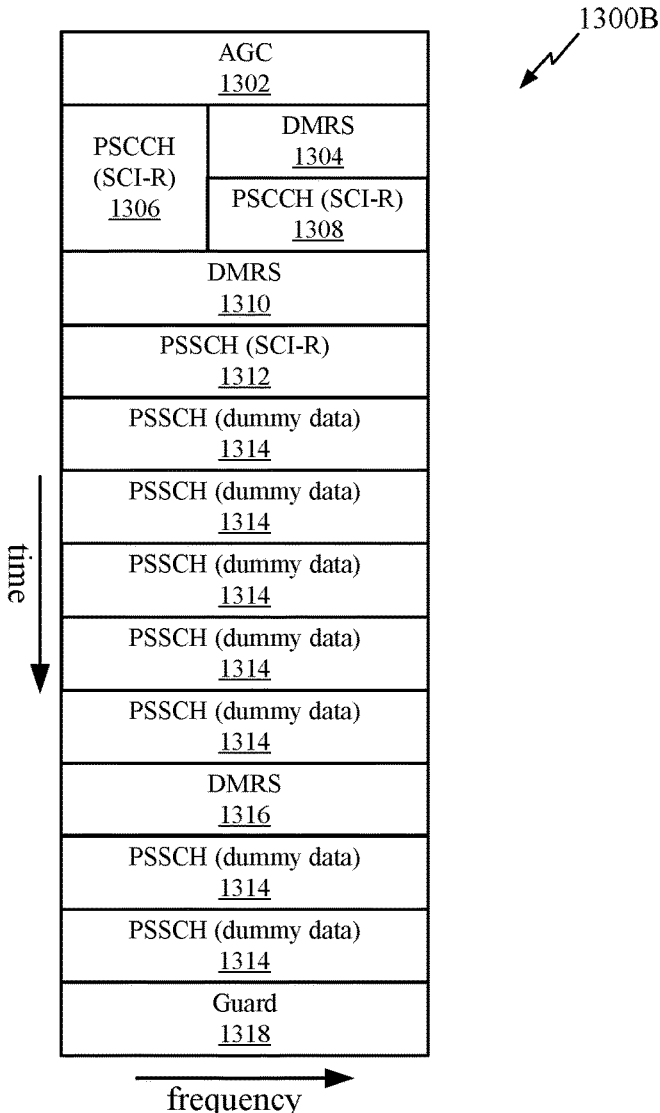
FIG. 13B illustrates an example time/frequency slot structure for communicating repeater configuration information via a sidelink control information (SCI-R) on physical sidelink control channel (PSCCH) and physical sidelink shared channel (PSSCH).

FIGS. 13A and 13B illustrate example time/frequency slot structures for communicating repeater configuration information via sidelink control information (SCI-R), in accordance with certain aspects of the present disclosure. The time/frequency slot structures may be used, for example, in operations 1100 of FIG. 11, or in operations 1200 of FIG. 12.

FIG. 13A illustrates an example time/frequency slot structure 1300A for communicating repeater configuration information via a standalone sidelink control information (SCI-R) on physical sidelink control channel (PSCCH). The time/frequency slot structure may be defined based on a resource pool. The first symbol 1302 is to provide a time interval during which a receiving device can carry out automatic gain control (AGC), to adjust the gain of the receiver to fit to the power of the received signal. Time/frequency slot structure 1300A also includes a demodulation reference (DMRS) symbol 1304 that helps in demodulating the data on PSCCH 1306. In this example, PSCCH includes standalone sidelink control information associated with a repeater (SCI-R), i.e., no associated data is transmitted on a physical sidelink shared channel (PSSCH). In this respect, the SCI-R may use a format definition of a 1st stage SCI (i.e., SCI that is transmitted on PSCCH) that includes the repeater configuration information. In some aspects, no sidelink shared channel data need to be transmitted. In some aspects, sensing and/or resource selection for transmission of the SCI-R may be simplified, or may be not necessary.

FIG. 13B illustrates an example time/frequency slot structure 1300B for communicating repeater configuration information via a sidelink control information (SCI-R) on PSCCH and/or PSSCH. The time/frequency slot structure may be defined based on a resource pool. The first symbol 1302 is to provide a time interval during which a receiving device can carry out automatic gain control (AGC), to adjust the gain of the receiver to fit to the power of the received signal. In some examples, AGC symbol 1302 is a copy of the following symbol. Time/frequency slot structure 1300B also includes demodulation reference (DMRS) symbols 1304, 1310 and 1316 that helps in demodulating the data on PSCCH 1306, 1308, and PSSCH 1312. In some examples, PSCCH may include sidelink control information associated with a repeater (SCI-R), that is transmitted as 1st stage SCI on PSCCH resources 1306 and 1308. Furthermore, SCI-R may be multiplexed on PSSCH 1312, using 2nd stage SCI. In some optional examples, SCI-R data is exclusively transmitted using a 2nd stage SCI. In some of such examples, PSCCH is used to transmit other sidelink related control data, such as sidelink scheduling information. In some examples, further symbols may carry PSSCH dummy data 1314 and DMRS 1316. In some examples, the symbols carrying PSSCH dummy data and DMRS 1316 may be muted to reduce interference. At the end of the PSCCH/PSSCH transmission there is also a guard symbol 1318, which may be used, for example, to provide a switching time between sidelink transmission/reception and vice versa. For time/frequency slot structure 1300B using PSCCH/PSSCH transmission, sensing and/or resource selection may be reduced, or maybe not necessary. In particular, a PSCCH/PSSCH transmission may only involve one slot (i.e., the slot in which the 1st stage SCI is transmitted), but not a reservation a of resources for further PSCCH/PSSCH transmissions.

Figure 14:
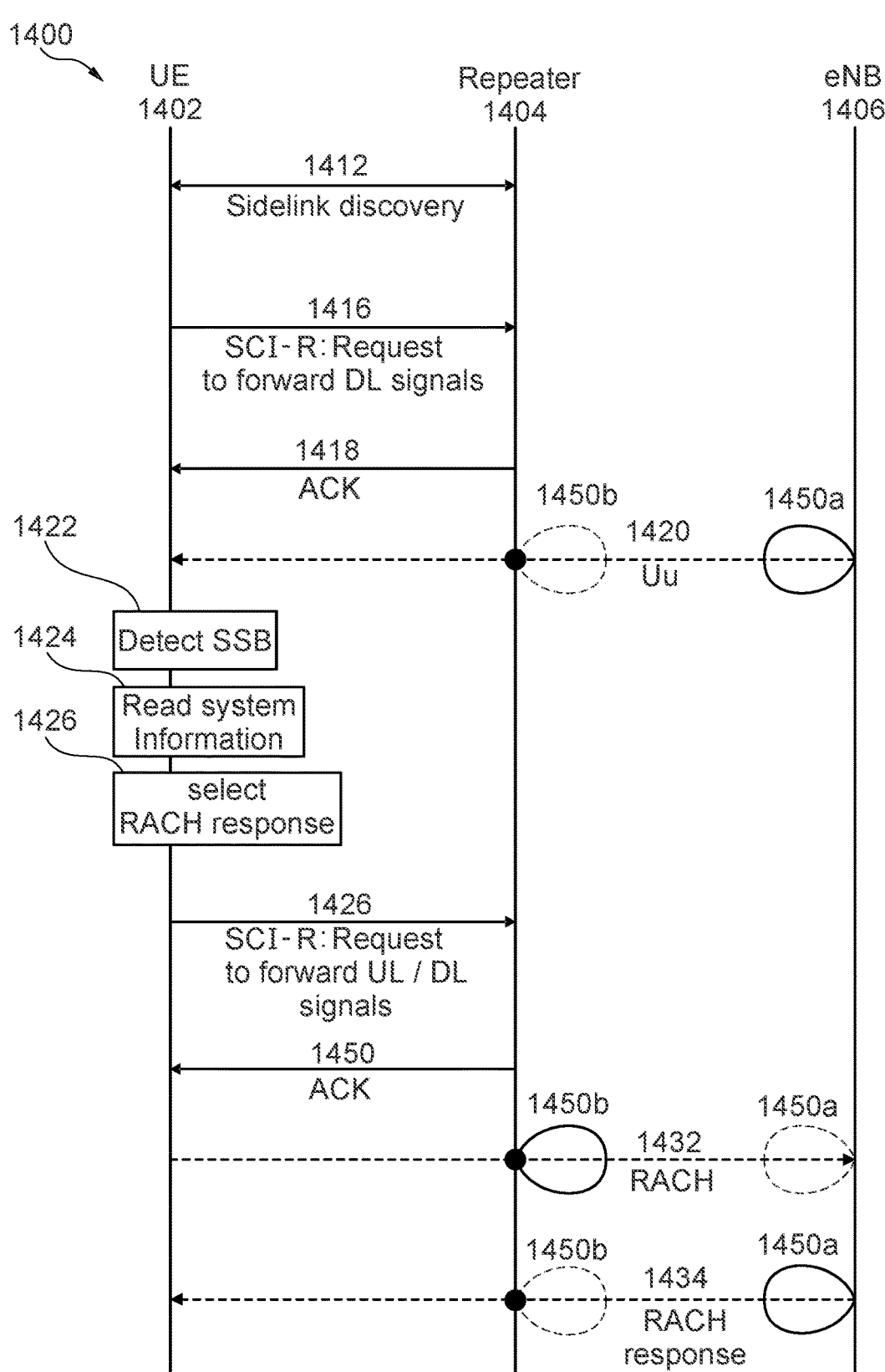
FIG. 14 illustrates an exemplary timeline of a random access process involving a UE, a sidelink-controlled repeater and a gNB, in accordance with certain aspects of the present disclosure.

FIG. 14 illustrates an exemplary timeline 1400 of a random access process involving a UE 1402, a sidelink-controlled repeater 1404 and a gNB 1406, in accordance with certain aspects of the present disclosure. In some aspects, the UE 1402 may be a sidelink-capable UE, such as one of UEs 112, 114, 116, 118 of FIG. 1. Furthermore, the UE may be as described in accordance with UEs 212 and 214 of FIG. 2, UEs 312 and 314 of FIG. 3, UEs 410 and 412 of FIG. 4, and UE 615 of FIG. 6. In some aspects, UE 1402 may be configurable to perform operations 1100 of FIG. 11. In some aspects, the repeater 1404 may be in accordance with repeater 402 and 404 of FIG. 4 and repeater 610 of FIG. 6, e.g., having an architecture 500 as illustrated in FIG. 5. Repeater 1404 may be configurable (e.g., based on operations 1200 of FIG. 12) to forward signals associated with a Uu link between UE 1402 and a base station, such as a gNB 1406, which may be in accordance with a network access node, such as base station 105 of FIG. 1, gNB 408 of FIG. 4, and gNB 605 of FIG. 6.

In some examples, UE 1402 may be out of coverage of the gNB 1406, while repeater 1404 may have coverage of gNB

1406. UE 1402 and repeater 1406 may be aware of the same resource pool configuration. For example, a resource pool configuration may be transmitted by gNB 1406. In another example, a pre-configured resource pool configuration is available at UE 1402 and repeater 1406. Repeater 1404 may be synchronized based on coverage of gNB 1406, or based on GNSS. UE 1402 may be synchronized using GNSS, or, e.g., based on a sidelink system synchronization block (S-SSB) received from repeater 1404.

At 1412, the UE and the repeater may perform sidelink device discovery. As an example, some or all of the techniques described above to discover sidelink devices using a discovery sequence and a discovery reply sequence may be used for discovery and optional establishment of beam conformance. Alternatively, repeater 1404 may transmit a sidelink system synchronization block (S-SSB) which may be received by UE 1402. In some examples, UE 1402 and repeater 1404 may be at relatively close distance, so that transmission on the sidelink (and on the Uu access link between UE 1402 and repeater 1404) may use a fix or static beam or antenna pattern of relatively large width (e.g., of an omnidirectional configuration, of 360 degrees or less, 180 degrees, 120 degrees, etc.). Optionally, UE 1402 and repeater 1404 may establish a beam pair link. In some aspects, this may be accomplished by involving an S-SSB burst, e.g., transmitted by the repeater 1404, wherein each S-SSB of the burst is transmitted towards a specific beam.

At 1416, UE 1402 may transmit sidelink configuration information (SCI-R) associated with repeater 1404 including a request to forward downlink signals. In some aspects, the SCI-R may be transmitted on the PSCCH without a physical sidelink shared channel (PSSCH). In some other aspects, the SCI-R transmission may include a PSCCH as well as PSSCH. In some aspects, the request may include a frequency range (e.g., a frequency band to scan for a network), an indication of a repeater backhaul receive beam (e.g. beam 1450b, when known to UE 1402, for example, from previous connections), or an indication of a repeater backhaul receive beam sweep to find one or more of the SSB's transmitted by eNB 1406 in an SSB burst. UE 1402 may start the timer for measuring and expiry time interval based on transmitting the SCI-R. In case no response is received within the expiry time interval, UE 1404 may determine a failure to decode the SCI-R at the repeater based on expiry of the timer. In such cases, UE 1402 may retry to transmit SCI-R.

Repeater 1404 may check whether the configuration can be granted. For example, the configuration may not be granted in case the repeater 1404 already serves a maximum number of users. In some aspects, when the request from UE 1402 is granted (or honored) by repeater 1404, repeater 1404 may send, at 1418, an acknowledgment within the expiry interval. Furthermore, at 1420, repeater 1404 may forward signals associated with an Uu link based on the repeater configuration information. In some examples, repeater 1404 may sweep backhaul link receive beams to give UE 1402 occasions to scan for SSB's transmitted by eNB 1406.

At 1422, UE 1402 may detect a SSB transmitted by gNB 1406 and forwarded by repeater 1404. In an optional, non-limiting example, the SSB may be received with repeater backhaul beam 1450b, while transmitted with beam 1450a at gNB 1406. UE 1402 may recognize beam 1450b based on a schedule for a beam sweep configured at repeater 1404 and based on a time instant within said schedule at which the SSB is received. UE 1402 may recognize beam 1450a (e.g., by determining the SSB time index), read system information at 1424, and determine or select a RACH resource, at 1426, based on determined SSB time index associated with beam 1450*a*.

At 1428, UE 1402 may transmit SCI-R on the sidelink including a request to the repeater to forward uplink signals based on the selected RACH resource, and to forward downlink signals based on resources associated with a RACH response. For example, the system information obtained from gNB 1406, which was received based on the detected SSB may include a TDD configuration that determines corresponding uplink and downlink intervals. Those UL/DL intervals may be used in the SCI-R to appropriately forward uplink and downlink signals, including RACH and RACH responses. In an example, the sidelink configuration information transmitted with this SCI-R may also include an identification of beam 1450*b*, to be used by the repeater.

At 1432, UE 1402 may transmit a RACH signal on the selected RACH resource, on the Uu link. Thereby, repeater 1404 forwards the signal towards beam 1450*b*. The gNB 1406 may recognize beam 1450*a* based on the selected RACH resource. Thereby, beam conformance on the backhaul Uu link is established.

At 1434, the eNB 1406 may respond with a RACH response, using beam 1450*a*. Repeater 1404 may receive the RACH response using beam 1450*b*, and forwards it towards UE 1402 by Uu link forwarding.

As illustrated by this example, repeater 1404 can be controlled by UE 1402 using sidelink control signalling to configure the repeater 1404 appropriately to forward Uu link signals in downlink and uplink direction. However, it is to be understood that while the illustrated example (and the other examples provided) may show typical aspects of this disclosure, it should not be considered limiting the scope of the present disclosure and the appended claims.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Means for receiving or means for obtaining may include a receiver (such as the receive processor 338) or an antenna(s) 334 of a first sidelink device 312 illustrated in FIG. 3 (in accordance with UE 112, 114, 115, 116, 118 of FIG. 1) or the receive processor 358 or antenna(s) 352 of the second sidelink device 314 illustrated in FIG. 3 (in accordance with UE 112, 114, 115, 116, 118 of FIG. 1, or repeater 500 of FIG. 5, or repeater 610 of FIG. 6). Means for transmitting or means for outputting may include a transmitter (such as the transmit processor 320) or an antenna(s) 334 of the first sidelink device 312 or the transmit processor 364 or antenna(s) 352 of the second sidelink device 314 illustrated in FIG. 3, or the transmitter and/or antenna arrays of repeater 610 of FIG. 6. Means for associating, means for determining, means for monitoring, means for deciding, means for providing, means for detecting, means for performing, and/or means for setting may include a processing system, which may include one or more processors, such as the receive processor 338/358, the transmit processor 320/364, the TX MIMO processor 330/366, or the controller 340/380 of the first sidelink device 312 and the second sidelink device 314 illustrated in FIG. 3 (in accordance with UE 112, 114, 115, 116, 118 of FIG. 1, or repeater 500 of FIG. 5, or repeater 610 of FIG. 6).

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 115 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system.

By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or access point as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or access point can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The following provides an overview of various examples illustrating different aspects in accordance with the present disclosure:

Example 1: A method of wireless communications (e.g., by a first sidelink device), comprising: transmitting a discovery sequence during a first slot of one or more first slots; monitoring for a discovery reply sequence from a second sidelink device during an associated second slot, wherein the associated second slot is a first number of slots later than the first slot; and in response to detecting a discovery reply sequence during the associated second slot, determining an indication of acceptance or an indication of rejection of service with the second sidelink device based on the detected discovery reply sequence.

Example 2: The method of example 1, wherein the discovery sequence transmitted during the first slot is transmitted towards a first beam associated with the first slot; wherein the monitoring for the discovery reply sequence is directed towards the first beam.

Example 3: The method of example 2, wherein the associated second slot is of one or more second slots respectively associated with the one or more first slots, the one or more second slots non-overlapping with the one or more first slots, the method further comprising: transmitting at least one further discovery sequence during at least one further first slot of the one or more first slots, wherein the at least one further discovery sequence transmitted during the at least one further first slot is transmitted towards at least one further first beam associated with the at least one further first slot; monitoring for a discovery reply sequence during the at least one associated further second slot of the one or more second slots, wherein the at least one associated further second slot is the first number of slots later than the respective at least one further first slot, wherein the monitoring is directed towards the further first beam; and in response to detecting the discovery reply sequence during the at least one associated further second slot, determining an indication of acceptance or an indication of rejection of service with the second sidelink device based on the detected discovery reply sequence during the associated at least one further second slot.

Example 4: The method of example 3, further comprising: periodically repeating the steps according to claim 3.

Example 5: The method of one or more of examples 1 to 4, wherein transmitting the discovery sequence includes transmitting the discovery sequence over resources of one or more OFDM symbols, each using one or more resource blocks (RB).

Example 6: The method of one or more of examples 1 to 5, wherein transmitting the discovery sequence includes transmitting the discovery sequence on resource elements of a single OFDM symbol that includes the resource elements of a physical sidelink feedback channel (PSFCH).

Example 7: The method of example 6, wherein the resource elements of the discovery sequence fully overlap with the resource elements that are configured for a PSFCH.

Example 8: The method of one or more of examples 1 to 7, wherein the discovery sequence is a sequence orthogonal to the base sequences used for physical sidelink feedback channel (PSFCH).

Example 9: The method of one or more of examples 1 to 8, wherein the first sidelink device is a sidelink capable UE, and the second sidelink device is a repeater controlled via sidelink.

Further example: An apparatus for wireless communications (e.g., by a first sidelink device), comprising means configured for executing the method of anyone of examples 1 to 9.

Further example: An apparatus for wireless communications (e.g., by a first sidelink device), wherein the apparatus includes at least one processor and a memory, wherein the at least one processor and the memory are configured to perform the method of anyone of examples 1 to 9.

Further example: A computer program comprising program instructions which, when the program is executed by a computer, carry out all steps of the method of anyone of examples 1 to 9.

Example 10: A method of wireless communications (e.g., by a second sidelink device), comprising: monitoring for a discovery sequence during one or more first slots; in response to detecting a discovery sequence from a first sidelink device during a first slot of the one or more first slots, transmitting a discovery reply sequence during an associated second slot, wherein the associated second slot is a first number of slots later than the first slot, wherein the discovery reply sequence includes an indication of acceptance or an indication of rejection of service with the second sidelink device.

Example 11: The method of example 10, wherein monitoring for a discovery sequence during the one or more first slots includes directing a receive beam direction towards a first receive beam during the one or more first slots, wherein the one or more first slots cover a monitoring interval of at least two times the first number of slots, the method further comprising: in response to detecting the discovery sequence during the first slot of the one or more first slots, transmitting the discovery reply sequence towards the first receive beam; in response to not detecting any discovery sequence during the one or more first slots, directing a receive beam direction towards a second receive beam and monitoring for a further discovery sequence during further one or more first slots, wherein the further one or more first slots are within a further monitoring interval.

Example 12: The method of one or more of examples 10 to 11, wherein detecting the discovery sequence includes comparing a receive power of the discovery sequence with a threshold, wherein the discovery sequence is determined to be detected when the receive power is above the threshold.

Example 13: The method of one or more of examples 10 to 12, wherein detecting the discovery sequence includes: detecting presence of at least one further discovery sequence during at least one further slot of the one or more first slots; determining that the discovery sequence associated with the first slot has strongest receive power; and transmitting the discovery reply sequence only during the associated second slot.

Example 14: The method of one or more of examples 10 to 13, wherein detecting the discovery sequence includes receiving the discovery sequence over resources of one or more OFDM symbols, each using one or more resource blocks (RB).

Example 15: The method of one or more of examples 10 to 14, wherein detecting the discovery sequence includes receiving the discovery sequence on resource elements of a single OFDM symbol that includes the resource elements of a physical sidelink feedback channel (PSFCH).

Example 16: The method of example 15, wherein the resource elements of the discovery sequence fully overlap with the resource elements that are configured for a PSFCH.

Example 17: The method of one or more of examples 10 to 16, wherein the discovery sequence is a sequence orthogonal to the base sequences used for physical sidelink feedback channel (PSFCH).

Example 18: The method of one or more of examples 10 to 17, wherein the first sidelink device is a sidelink capable UE, and the second sidelink device is a repeater controlled via sidelink.

Further example: An apparatus for wireless communications (e.g., by a second sidelink device), comprising means configured for executing the method of anyone of examples 10 to 18.

Further example: An apparatus for wireless communications (e.g., by a second sidelink device), wherein the apparatus includes at least one processor and a memory, wherein the at least one processor and the memory are configured to perform the method of anyone of examples 10 to 18.

Further example: A computer program comprising program instructions which, when the program is executed by a computer, carry out all steps of the method of anyone of examples 10 to 18.

Example A1: A method of wireless communications by a user equipment (UE), comprising: transmitting sidelink control information associated with a repeater (SCI-R) on a physical sidelink control channel (PSCCH), the sidelink control information including repeater configuration information; starting a timer for measuring an expiry time interval based on transmitting the SCI-R; receiving, within the expiry time interval, physical sidelink feedback channel (PSFCH) information, wherein an ACK indicates that a configuration of the repeater according to the configuration information is granted, and wherein a NACK indicates that the configuration of the repeater is not granted; or determining a failure to decode the SCI-R at the repeater based on expiry of the timer.

Example A2: The method of example A1, wherein the repeater configuration information includes at least one of: one or more indications that signals are to be forwarded by the repeater in the downlink; one or more indications that signals are to be forwarded by the repeater in the uplink; one or more indications of a frequency range or bandwidth part (BWP) of signals to be forwarded by the repeater; one or more indications of forwarding time intervals of signals to be forwarded by the repeater; an indication of a repeater backhaul link beam sweep or backhaul link beam switch to be performed during one or more forwarding time intervals; an indication of a feedback opportunity for the repeater to indicate whether or not the request is granted.

Example A3: The method of one or more of examples A1 to A2, wherein the SCI-R is transmitted on the PSCCH without a physical sidelink shared channel (PSSCH).

Example A4: The method of one or more of examples A1 to A3, wherein the SCI-R is transmitted on the PSCCH, the transmission including a physical sidelink shared channel (PSSCH).

Example A5: The method of one or more of examples A1 to A4, wherein the repeater configuration information includes a request to forward downlink signals, the method further comprising: receiving an ACK as PSFCH information.

Example A6: The method of example A5, wherein the request to forward downlink signals includes at least one of a frequency range, an indication of a repeater backhaul receive beam, or an indication of a repeater backhaul receive beam sweep.

Example A7: The method of one or more of examples A5 to A6, further comprising: in response to receiving at least one system synchronization block (SSB) from a gNB via the repeater: determining a repeater backhaul beam based on the received at least one SSB; selecting a RACH resource; transmitting SCI-R via the sidelink including a request to the repeater based on the determined repeater backhaul beam to forward uplink signals based on the selected RACH resource, and to forward downlink signals based on resources associated with a RACH response; transmitting a RACH on the selected RACH resource; and monitoring for a RACH response message.

Example A8: The method of one or more of examples A1 to A6, wherein the UE is in RRC connected state with a network including a gNB, and the request to forward downlink signals is based on a repeater backhaul beam, and based on at least one of a frequency range of resources configured by the gNB for downlink transmissions to the UE, or for a frequency range configured for uplink resources.

Example A9: The method of one or more of examples A1 to A8, further comprising: receiving a downlink transmission from the gNB indicating that a beam refinement or a beam switch is to be performed; transmitting SCI-R via the sidelink including a request to the repeater to perform the indicated refinement or switch of the repeater backhaul beam.

Example A10: The method of Example A9, wherein the SCI-R includes fields to indicate at least one of: a number of beams to be measured; at least one slot associated with each beam; an indication of whether the beam is to be refined or switched; and a direction of the measurements.

Example A11: The method of one or more of examples A1 to A10, further comprising: receiving a downlink transmission from the gNB indicating that gain control is to be performed; transmitting SCI-R via the sidelink including a request to the repeater to perform the indicated gain control of the repeater backhaul beam.

Example A12: The method example A11, wherein the SCI-R includes fields to indicate at least one of: the number of measurement instances; an increase or update step size of the power at the repeater.

Example A13: The method of one or more of examples A1 to A10, wherein the UE transmits the SCI-R towards a UE sidelink beam. Example A13a: The method of example A13, further comprising: executing the method of anyone of examples 1 to 9 to determine the UE sidelink beam.

Further example: An apparatus for wireless communications (e.g., by a user equipment, UE), comprising means configured for executing the method of anyone of examples A1 to A13 and A13a.

Further example: An apparatus for wireless communications (e.g., by a user equipment, UE), wherein the apparatus includes at least one processor and a memory, wherein the at least one processor and the memory are configured to perform the method of anyone of examples A1 to A13 and A13a.

Further example: A computer program comprising program instructions which, when the program is executed by a computer, carry out all steps of the method of anyone of examples A1 to A13 and A13a.

Example A14: A method of wireless communications (e.g., by a repeater), comprising: receiving sidelink control information associated with the repeater (SCI-R) on a physical sidelink control channel (PSCCH), the sidelink control information including repeater configuration information; determining whether the configuration is granted; transmitting physical sidelink feedback channel (PSFCH) information, wherein an ACK indicates that the configuration of the repeater according to the configuration information is granted, and wherein a NACK indicates that the configuration of the repeater is not granted.

Example A15: The method of example A14, wherein the repeater configuration information includes at least one of: one or more indications that signals are to be forwarded by the repeater in the downlink; one or more indications that signals are to be forwarded by the repeater in the uplink; one or more indications of a frequency range or bandwidth part (BWP) of signals to be forwarded by the repeater; one or more indications of forwarding time intervals of signals to be forwarded by the repeater; an indication of a repeater backhaul link beam sweep or backhaul link beam switch to be performed during one or more forwarding time intervals; an indication of a feedback opportunity for the repeater to indicate whether or not the request is granted.

Example A16: The method of one or more of examples A14 to A15, wherein the SCI-R is received on the PSCCH without a physical sidelink shared channel (PSSCH).

Example A17: The method of one or more of examples A14 to A16, wherein the SCI-R is received on the PSCCH, the transmission including a physical sidelink shared channel (PSSCH).

Example A18: The method of one or more of examples A14 to A17, wherein the repeater configuration information includes a request to forward downlink signals, the method further comprising: determining that the request is granted; transmitting an ACK as PSFCH information.

Example A19: The method of example A18, wherein the request to forward downlink signals includes at least one of a frequency range, an indication of a repeater backhaul receive beam, or an indication of a repeater backhaul receive beam sweep.

Example A20: The method of one or more of examples A14 to A19, further comprising: receiving SCI-R via the sidelink including a request to the repeater based on a repeater backhaul beam to forward uplink signals based on a RACH resource, and to forward downlink signals based on resources associated with a RACH response; performing the requested configurations to forward the uplink and downlink signals.

Example A21: The method of one or more of examples A18 to A20, wherein the request to forward downlink signals is based on a repeater backhaul beam, and based on at least one of a frequency range of resources for downlink transmissions to the UE, or for a frequency range configured for uplink resources.

Example A22: The method of one or more of examples A14 to A21, further comprising: receiving SCI-R via the sidelink including a request to perform a refinement or switch of the repeater backhaul beam. performing the requested refinement or switch of the repeater backhaul beam.

Example A23: The method of example A22, wherein the SCI-R includes fields to indicate at least one of: a number of beams to be measured; at least one slot associated with each beam; an indication of whether the beam is to be refined or switched; or a direction of the measurements.

Example A24: The method of one or more of examples A14 to A23, further comprising: receiving SCI-R via the sidelink including a request to perform a gain control of the repeater backhaul beam; performing the requested gain control of the repeater backhaul beam.

Example A25: The method of example A24, wherein the SCI-R includes fields to indicate at least one of: the number of measurement instances; an increase or update step size of the power at the repeater.

Example A26: The method of one or more of examples A14 to A25, wherein the SCI-R is received towards a repeater sidelink beam. Example A26a: The method of example A26, further comprising: executing the method of anyone of examples 10 to 18 to determine the repeater sidelink beam.

Further example: An apparatus for wireless communications (e.g., by a repeater), comprising means configured for executing the method of anyone of examples A14 to A26 and A26a.

Further example: An apparatus for wireless communications (e.g., by a repeater), wherein the apparatus includes at least one processor and a memory, wherein the at least one processor and the memory are configured to perform the method of anyone of examples A14 to A26 and A26a.

Further example: A computer program comprising program instructions which, when the program is executed by a computer, carry out all steps of the method of anyone of examples A14 to A26 and A26a.

The invention claimed is:

1. A method of wireless communications by a first sidelink device, comprising:

transmitting a discovery sequence during a first slot of one or more first slots, wherein the discovery sequence is a sequence orthogonal to base sequences used for sidelink communications;

receiving, from a second sidelink device during an associated second slot, a discovery reply sequence, wherein the associated second slot is a first number of slots later than the first slot, and wherein the discovery reply sequence is associated with an indication of acceptance of service with the second sidelink device in response to the discovery sequence; and

transmitting, in response to the indication of acceptance, sidelink control information comprising a repeater configuration indicating one or more resources for the second sidelink device to forward signals from a network entity to the first sidelink device.

2. The method of claim 1, wherein the discovery sequence transmitted during the first slot is transmitted towards a first beam associated with the first slot, and wherein the method further comprises:

monitoring for the discovery reply sequence in a direction of the first beam.

3. The method of claim 2, wherein the associated second slot is of one or more second slots respectively associated with the one or more first slots, the one or more second slots non-overlapping with the one or more first slots, the method further comprising:

transmitting at least one further discovery sequence during at least one further first slot of the one or more first slots, wherein the at least one further discovery sequence transmitted during the at least one further first slot is transmitted towards at least one further first beam associated with the at least one further first slot; and receiving, from the second sidelink device during at least one further second slot of the one or more second slots, a second discovery reply sequence, wherein the at least one further second slot is the first number of slots later than the at least one further first slot, wherein the second discovery reply sequence is directed toward the at least one further first beam, and wherein the second discovery reply sequence is associated with an indication of acceptance of service with the second sidelink device based on the second discovery reply sequence during the at least one further second slot.

4. The method of claim 3, further comprising:

transmitting, periodically, one or more further discovery sequences during one or more further first slots of the one or more first slots, wherein the one or more further discovery sequences are transmitted toward one or more further first beams associated with the one or more further first slots; and receiving, periodically from the second sidelink device during the one or more second slots, one or more third discovery reply sequences, wherein the one or more second slots are the first number of slots later than the at least one further first slot, wherein the one or more third discovery reply sequences are directed toward the one or more further first beams, and wherein the one or more third discovery reply sequences are associated with an indication of acceptance or an indication of rejection of service with the second sidelink device based on the one or more third discovery reply sequences during the one or more second slots.

5. The method of claim 1, wherein the transmitting the discovery sequence includes transmitting the discovery sequence over resources of one or more OFDM symbols, each using one or more resource blocks (RB).

6. The method of claim 1, wherein the transmitting the discovery sequence includes transmitting the discovery sequence on resource elements of a single OFDM symbol that includes the resource elements of a physical sidelink feedback channel (PSFCH).

7. The method of claim 6, wherein the resource elements of the discovery sequence fully overlap with the resource elements that are configured for the PSFCH.

8. The method of claim 1, wherein the base sequences are used for physical sidelink feedback channel (PSFCH).

9. The method of claim 1, wherein the first sidelink device is a sidelink capable UE, and the second sidelink device is a repeater controlled via sidelink.

10. A method of wireless communications by a second sidelink device, comprising:

receiving, from a first sidelink device, a discovery sequence during one or more first slots, wherein the discovery sequence is a sequence orthogonal to base sequences used for sidelink communications;

transmitting a discovery reply sequence during an associated second slot, wherein the associated second slot is a first number of slots later than a first slot, of the one or more first slots, via which the discovery sequence is received, wherein the discovery reply sequence includes an indication of acceptance of service with the second sidelink device; and receiving, in response to the indication of acceptance, sidelink control information comprising a repeater configuration indicating one or more resources for the second sidelink device to forward signals from a network entity to the first sidelink device.

11. The method of claim 10, wherein the receiving the discovery sequence during the one or more first slots includes directing a receive beam direction towards a first receive beam during the one or more first slots, wherein the one or more first slots cover a monitoring interval of at least two times the first number of slots, the method further comprising:

in response to receiving the discovery sequence during the first slot of the one or more first slots, transmitting the discovery reply sequence towards the first receive beam.

12. The method of claim 10, wherein receiving the discovery sequence includes comparing a receive power of the discovery sequence with a threshold, wherein the discovery sequence is determined to be detected when the receive power is above the threshold.

13. The method of claim 12, wherein the receiving of the discovery sequence includes:

receiving at least one further discovery sequence during at least one further slot of the one or more first slots;

determining that the discovery sequence associated with the first slot has strongest receive power; and transmitting the discovery reply sequence only during the associated second slot.

14. The method of claim 10, wherein the receiving the discovery sequence includes receiving the discovery sequence over resources of one or more OFDM symbols, each using one or more resource blocks (RB).

15. The method of claim 10, wherein the receiving the discovery sequence includes receiving the discovery sequence on resource elements of a single OFDM symbol that includes the resource elements of a physical sidelink feedback channel (PSFCH).

16. The method of claim 15, wherein the resource elements of the discovery sequence fully overlap with the resource elements that are configured for the PSFCH.

17. The method of claim 10, wherein the base sequences are used for physical sidelink feedback channel (PSFCH).

18. The method of claim 10, wherein the first sidelink device is a sidelink capable UE, and the second sidelink device is a repeater controlled via sidelink.

19. An apparatus for wireless communications by a first sidelink device, comprising:

one or more processors and one or more memories, wherein the one or more processors and the one or more memories are configured to:

transmit a discovery sequence during a first slot of one or more first slots, wherein the discovery sequence is a sequence orthogonal to base sequences used for sidelink communications;

receive, from a second sidelink device during an associated second slot, a discovery reply sequence, wherein the associated second slot is a first number of slots later than the first slot, and wherein the discovery reply sequence is associated with an indication of acceptance of service with the second sidelink device in response to the discovery sequence; and transmit, in response to the indication of acceptance, sidelink control information comprising a repeater configuration indicating one or more resources for the second sidelink device to forward signals from a network entity to the first sidelink device.

20. The apparatus of claim 19, wherein the discovery sequence transmitted during the first slot is transmitted towards a first beam associated with the first slot, and wherein the one or more processors and the one or more memories are further configured to:

monitor for the discovery reply sequence in a direction of the first beam.

21. The apparatus of claim 20, wherein the associated second slot is of one or more second slots respectively associated with the one or more first slots, the one or more second slots non-overlapping with the one or more first slots, wherein the one or more processors and the one or more memories are further configured to:

transmit at least one further discovery sequence during at least one further first slot of the one or more first slots, wherein the at least one further discovery sequence transmitted during the at least one further first slot is transmitted towards at least one further first beam associated with the at least one further first slot; and receive, from the second sidelink device during at least one further second slot of the one or more second slots, a second discovery reply sequence, wherein the at least one further second slot is the first number of slots later than the at least one further first slot, wherein the second discovery reply sequence is directed toward the at least one further first beam, and wherein the second discovery reply sequence is associated with an indication of acceptance of service with the second sidelink device based on the second discovery reply sequence during the at least one further second slot.

22. The apparatus of claim 19, wherein the one or more processors and the one or more memories are further configured to: transmit the discovery sequence over resources of one or more OFDM symbols, each using one or more resource blocks (RB).

23. The apparatus of claim 19, wherein the one or more processors and the one or more memories are further configured to: transmit the discovery sequence on resource elements of a single OFDM symbol that includes the resource elements of a physical sidelink feedback channel (PSFCH).

24. The apparatus of claim 19, wherein the base sequences are used for physical sidelink feedback channel (PSFCH).

25. An apparatus for wireless communications by a second sidelink device, wherein the apparatus includes one or more processors and one or more memories, wherein the one or more processors and the one or more memories are configured to:

receive, from a first sidelink device, a discovery sequence during one or more first slots, wherein the discovery sequence is a sequence orthogonal to base sequences used for sidelink communications;

transmit a discovery reply sequence during an associated second slot, wherein the associated second slot is a first number of slots later than a first slot, of the one or more first slots, via which the discovery sequence is received, wherein the discovery reply sequence includes an indication of acceptance or an indication of rejection of service with the second sidelink device; and receive, in response to the indication of acceptance, sidelink control information comprising a repeater configuration indicating one or more resources for the second sidelink device to forward signals from a network entity to the first sidelink device.

26. The apparatus of claim 25, wherein the receiving the discovery sequence during the one or more first slots includes directing a receive beam direction towards a first receive beam during the one or more first slots, wherein the one or more first slots cover a monitoring interval of at least two times the first number of slots, wherein the one or more processors and the one or more memories are further configured to:

receive the discovery sequence during the first slot of the one or more first slots; and transmit the discovery reply sequence towards the first receive beam.

27. The apparatus of claim 25, wherein the receiving the discovery sequence includes comparing a receive power of the discovery sequence with a threshold, wherein the discovery sequence is determined to be detected when the receive power is above the threshold.

28. The apparatus of claim 25, wherein the receiving the discovery sequence includes:

receiving at least one further discovery sequence during at least one further slot of the one or more first slots;

determining that the discovery sequence associated with the first slot has strongest receive power; and transmitting the discovery reply sequence only during the associated second slot.

29. The apparatus of claim 25, wherein the one or more processors and the one or more memories are further configured to: receive the discovery sequence over resources of one or more OFDM symbols, each using one or more resource blocks (RB).

30. The apparatus of claim 25, wherein the one or more processors and the one or more memories are further configured to: receive the discovery sequence on resource elements of a single OFDM symbol that includes the resource elements of a physical sidelink feedback channel (PSFCH).

* * * * *